United States Patent
Patolsky et al.

(10) Patent No.: US 9,786,943 B2
(45) Date of Patent: Oct. 10, 2017

(54) DIRECT LIQUID FUEL CELL HAVING AMMONIA BORANE, HYDRAZINE, DERIVATIVES THEREOF OR/AND MIXTURES THEREOF AS FUEL

(75) Inventors: Fernando Patolsky, Rehovot (IL); Boris Filanovsky, Bat-Yam (IL); Eran Granot, Moshav Even Sapir (IL); Igor Presman, Hadera (IL); Ilia Kuras, Modiln (IL); Ricardo Osiroff, Ganei-Tikva (IL); Opher Shapira, Tel-Aviv (IL)

(73) Assignees: Ramot at Tel-Aviv University Ltd., Tel-Aviv (IL); Tracense Systems Ltd., Herzlia (IL)

( * ) Notice: Subject to any disclaimer, the term of this patent is extended or adjusted under 35 U.S.C. 154(b) by 612 days.

(21) Appl. No.: 13/879,409

(22) PCT Filed: Oct. 11, 2011

(86) PCT No.: PCT/IB2011/054467
§ 371 (c)(1),
(2), (4) Date: Apr. 15, 2013

(87) PCT Pub. No.: WO2012/049616
PCT Pub. Date: Apr. 19, 2012

(65) Prior Publication Data
US 2013/0230747 A1    Sep. 5, 2013

Related U.S. Application Data

(60) Provisional application No. 61/392,988, filed on Oct. 14, 2010.

(51) Int. Cl.
*H01M 8/10* (2016.01)
*H01M 8/1009* (2016.01)
(Continued)

(52) U.S. Cl.
CPC ....... *H01M 8/1009* (2013.01); *H01M 4/9008* (2013.01); *H01M 4/9016* (2013.01);
(Continued)

(58) Field of Classification Search
CPC ............. H01M 4/9008; H01M 4/9016; H01M 8/0289; H01M 8/222
(Continued)

(56) References Cited

U.S. PATENT DOCUMENTS 3,811,949 A    5/1974  Jung
6,183,623 B1   2/2001  Cisar et al.
(Continued)

FOREIGN PATENT DOCUMENTS

DE    2049008    4/1972
EP    1324411    7/2003
(Continued)

OTHER PUBLICATIONS

Communication Relating to the Results of the Partial International Search Dated Feb. 3, 2012 From the International Searching Authority Re. Application No. PCT/IB2011/054467.
(Continued)

*Primary Examiner* — Mark F Huff
*Assistant Examiner* — Monique Wills

(57) ABSTRACT

A fuel cell system comprising an anode compartment which comprises an anode having a copper catalyst layer, a cathode configured as an air cathode and a separator interposed between said anode and said cathode, operable by an amine-derived fuel and oxygen (or air) is disclosed. Further disclosed are fuel cell systems comprising an anode compartment which comprises an anode having a copper catalyst layer, a cathode and a separator interposed between said anode and said cathode, which are operable by a mixture of two types of amine-derived compounds (e.g., ammonia
(Continued)

borane, hydrazine and derivatives thereof). Also disclosed are methods of producing electric energy by, and electric-consuming devices containing and operable by, the disclosed fuel cell systems.

11 Claims, 9 Drawing Sheets
(5 of 9 Drawing Sheet(s) Filed in Color)

(51) Int. Cl.
*H01M 4/90* (2006.01)
*H01M 8/1018* (2016.01)
*H01M 8/22* (2006.01)
*H01M 8/0289* (2016.01)

(52) U.S. Cl.
CPC ....... *H01M 8/0289* (2013.01); *H01M 8/1018* (2013.01); *H01M 8/222* (2013.01)

(58) Field of Classification Search
USPC ...................................................... 429/9, 482
See application file for complete search history.

(56) References Cited

U.S. PATENT DOCUMENTS

| | | | |
|---|---|---|---|
| 6,554,877 | B2 | 4/2003 | Finkelshtain et al. |
| 6,562,497 | B2 | 5/2003 | Finkelshtain et al. |
| 6,758,871 | B2 | 7/2004 | Finkelshtain et al. |
| 7,176,247 | B1 | 2/2007 | Walker, Jr. |
| 2003/0134181 | A1 | 7/2003 | Fukuda et al. |
| 2003/0207157 | A1 | 11/2003 | Finkelshtain et al. |
| 2003/0228972 | A1 | 12/2003 | Birss et al. |
| 2006/0035129 | A1* | 2/2006 | Nomura ................. C08G 77/28 429/493 |
| 2006/0078783 | A1 | 4/2006 | Bluvstein et al. |
| 2006/0113034 | A1* | 6/2006 | Seabaugh ........... H01M 8/1246 156/308.2 |
| 2008/0135403 | A1* | 6/2008 | Jang ......................... C25B 1/04 204/274 |
| 2008/0145733 | A1 | 6/2008 | Asazawa et al. |
| 2009/0068544 | A1* | 3/2009 | Ragsdale .............. C10L 1/1822 429/494 |
| 2009/0191435 | A1* | 7/2009 | McLean .............. H01M 8/0202 429/434 |
| 2013/0224632 | A1* | 8/2013 | Roumi .................. H01M 2/166 429/516 |

FOREIGN PATENT DOCUMENTS

| | | | |
|---|---|---|---|
| EP | 1858101 | 11/2007 | |
| JP | 2002008440 A | * 1/2002 | ............ H01M 10/40 |
| JP | 2007-035325 | 2/2007 | |
| JP | 2009-068080 | 4/2009 | |
| WO | WO 01/28013 | 4/2001 | |
| WO | WO 2010/055511 | 3/2010 | |
| WO | WO 2010/055512 | 5/2010 | |
| WO | WO 2012/049616 | 4/2012 | |

OTHER PUBLICATIONS

International Preliminary Report on Patentability Dated Apr. 25, 2013 From the International Bureau of WIPO Re. Application No. PCT/IB2011/054467.
International Search Report and the Written Opinion Dated Mar. 16, 2012 From the International Searching Authority Re. Application No. PCT/IB2011/054467.
Corey et al. "Chemistry of Diimide. II. Stereochemistry of Hydrogen Transfer to Carbon-Carbon Multiple Bonds", Journal of the American Chemical Society, JACS, 83(13): 2957-2958, Jul. 5, 1961.
Demirci et al. "Sodium Borohydride Versus Ammonia Borane, in Hydrogen Storage and Direct Fuel Cell Applications", Energy & Environmental Science, 2: 627-637, 2009.
Jiang et al. "Catalytic Effect of Nanogold on Cu(II)-N2H4 Reaction and Its Application to Resonance Scattering Immunoassay", Analytical Chemistry, 80(22): 8681-8687, Nov. 15, 2008.
Karim-Nezhad et al. "Copper (Hydr)Oxide Modified Copper Electrode for Electrocatalytic Oxidation of Hydrazine in Alkaline Media", Electrochimica Acta, 54: 5721-5726, 2009.
Lin et al. "Cupric Ion Catalyzed Diimide Production From the Reaction Between Hydrazine and Hydrogen Peroxide", Applied Catalysis A: General, 263: 27-32, 2004.
Wellman et al. "Kinetics of the Oxidation of Hydrazine by Hydrogen Peoxide, Catalyzed by Hydrated Copper(II)", Journal of the American Chemical Society, 98(7): 1683-1684, Mar. 31, 1976.
Xu et al. "Catalytic Activities of Non-Noble Metals for Hydrogen Generation From Aqueous Ammonia-Borane at Room Temperature", Journal of Power Sources, XP002573446, 163(1): 364-370, Dec. 7, 2006. Abstract.
Yamada et al. "Potential Application of Anion-Exchange Membrane for Hydrazine Fuel Cell Electrolyte", Electrochemistry Communications, 5: 892-896, 2003.
Yao et al. "A Preliminary Study of Direct Borazane Fuel Cell", Journal of Power Sources, 165: 125-127, 2007.
Zhang et al. "A High Performance Anion Exchange Membrane-Type Ammonia Borane Fuel Cell", Journal of Power Sources, 182: 515-519, 2008.
Zhang et al. "A New Fuel Cell Using Aqueous Ammonia-Borane as the Fuel", Journal of Power Sources, 168: 167-171, 2007.

\* cited by examiner

Cathode
$3 H_2O + 1½ O_2 + 6 e^- \longrightarrow 6OH^-$

Anode
$BH_3\text{-}NH_3 + 7OH^- \longrightarrow BO_2^- + 5H_2O + NH_3 + 6e^-$ $3 H_2O + 1½ O_2 + 6 e^- \longrightarrow 6OH^-$    $NH_2\text{-}NH_2 + 4OH^- \longrightarrow N_2 + 4 H_2O + 4e^-$

DIRECT LIQUID FUEL CELL HAVING AMMONIA BORANE, HYDRAZINE, DERIVATIVES THEREOF OR/AND MIXTURES THEREOF AS FUEL

RELATED APPLICATIONS

This application is a National Phase of PCT Patent Application No. PCT/IB2011/054467 having International filing date of Oct. 11, 2011, which claims the benefit of priority under 35 USC §119(e) of U.S. Provisional Patent Application No. 61/392,988 filed on Oct. 14, 2010. The contents of the above applications are all incorporated by reference as if fully set forth herein in their entirety.

FIELD AND BACKGROUND OF THE INVENTION

The present invention, in some embodiments thereof, relates to energy conversion and, more particularly, but not exclusively, to a direct liquid fuel cell system, which utilizes ammonia borane, hydrazine or derivatives thereof as fuel, and to applications employing such a fuel cell system.

Fuel cells (FC) are well-known and widely studied electrochemical devices that enable the conversion of the chemical energy of fuels directly into electrical energy, thereby avoiding the Carnot cycle limitations and loss of efficiency associated with combustion-related engines. Contemporary hydrogen-oxygen fuel cells can be 50%-65% efficient in practice. Such efficiency values are far higher than typical values for internal combustion engines. Fuel cells are generally characterized by high theoretical energy density—4 to 8 KWh/kg—much higher than conventional batteries, which are limited to specific energies of 150-200 Wh/kg. Since the power source is the weakest link in many expanding industries, fuel cells is one of the main thrusts in the field of power engineering.

Over the past four decades, several different types of fuel cells (typically categorized by the electrolyte they use), most being hydrogen-based fuel cells, have been developed for a wide range of applications. Although present-day fuel cells have proven generally useful for their intended purposes, they all suffer from inherent deficiencies which detract from their utility and desirability. Some of the most handicapping limitations of current fuel cell technologies are related to the use of expensive noble metal catalysts, limited catalyst structural and functional stabilities, and noble metal catalyst low tolerance for even very low concentrations of carbon dioxide (few ppm at 80° C.) which inherently limits fuel cell operation.

The present inventors have previously uncovered that fuel cell systems which are operable by ammonia borane, hydrazine, or derivatives thereof, act efficiently also in the presence of non-noble metals and/or non-metallic substances. The present inventors have uncovered that a copper-based catalyst can be efficiently used for the anode. See, WO 2010/055511 and WO 2010/055512, which are incorporated by reference as if fully set forth herein.

Ammonia borane (or borazane) is characterized by an electrical capacity of 5200 Ah/kg, energy density of 8400 Wh/kg (as $NaBH_4$) and hydrogen content of 19% (w/w). AB is stable in aqueous solutions at pH≥6.5, in contrast to $BH_4^-$. The standard potential of reduction ($E_0$) of Ammonia-borane is −1.216 V (see, equation 2 below).

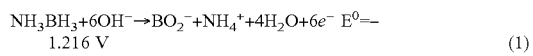
$NH_3BH_3+6OH^- \rightarrow BO_2^- + NH_4^+ + 4H_2O + 6e^-$  $E^0 = -1.216$ V  (1)

Yao et al. [Journal of Power Sources 2007, 165, 125; referred to herein throughout as Zhung] described a fuel cell consisting of 0.5 M AB (2 M NaOH)—Ag catalyst/air/$MnO_2$ catalyst. The cell produces an open circuit potential ($E_{OCP}$) of −1.15 V, a current of 1 mA/cm² for $E_W$=0.9 V, a current of 2 mA/cm² for $E_W$=0.8 V and a current of 10 mA/cm² for $E_W$=0.4 V.

Zhang et al. [J. Pow. Sour. 2007, 168, 167; referred to herein throughout as Xu-1] describe a fuel cell consisting of AB (2 M NaOH)-air fuel cell using Pt catalyst (0.15 mg/cm² for anode and cathode). In this fuel cell, thiourea (1 mM) was added to the background electrolyte in order to prevent fuel spontaneous hydrolysis (decomposition). The cell produces a current of 24 mA/cm² ($E_W$=0.8 V) at room temperature. Zhang et al. [J. Pow. Sour. 2008, 182, 515; referred to hereinthroughout as Xu-2] further described fuel cell that consists of anode—0.5 M AB (2M NaOH)/Pt-0.9 mg/cm²/cathode Pt-1.3 mg/cm², humidified $O_2$. Pump was used for fuel supply and fan was used for air ($O_2$) supply. The cell produces a current of 50 mA/cm² at $E_W$=0.75 V ($E_{OCP}$=−1.08 V).

Further background art includes a review by Demirchi and Miele [Energy & Environmental Sci, 2009, DOI 10.1039/b900595a)], in which sodium borohydride-based fuel cells vs. ammonia borane-based fuel cells are discussed.

Hydrazine is considered a hazardous compound, both in its pure form (as $N_2H_4$) and as a monohydrate ($N_2H_4.H_2O$). Yet, hydrazine is non-explosive and non-toxic in diluted aqueous solutions. Moreover, several hydrazine salts, such as, for example, $N_2H_4.H_2SO_4$ are reported as prospective anticancer drugs [see, for example, Upton et al. Tren. Pharm. Sci. 2001, 22, 140-146].

The basic sources of hydrazine in nature are unlimited ($N_2$ and $H_2$) and the recycling of hydrazine from its basic elements ($N_2$ and $H_2$) is relatively simple. In addition, hydrazine decomposition results in byproducts, nitrogen ($N_2$) and water ($H_2O$), which are ecologically friendly.

The electrochemical oxidation of hydrazine in a basic solution produces four electrons, nitrogen gas ($N_2$) and water, as presented in Equation 1 hereinbelow:

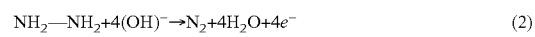
$NH_2-NH_2+4(OH)^- \rightarrow N_2+4H_2O+4e^-$  (2)

The standard potential of hydrazine oxidation ($E^O$) corresponds to −1.21 V, its theoretical specific electrical capacity corresponds to 3.35 KAh/kg and its specific theoretical power (W) corresponds to 4.05 KWh/kg (3,350·1.21).

The electrochemical properties of hydrazine in alkaline solutions were investigated in the last three decades using different metal catalysts such as platinum (Pt), palladium (Pd), Nickel (Ni), cobalt (Co), gold (Au), silver (Ag) and mercury (Hg).

Amongst the tested metals, Co, Ni and especially Pt-group metals (PGM) were found to perform as the best catalysts for the electro-oxidation of hydrazine.

U.S. Patent Application No. 2008/0145733, by Asazawa et al., discloses fuel cells operated using hydrazine and other amine and hydrogen containing compounds as fuel and a cobalt-containing catalyst layer.

Ghasem Karim-Nezhad et al. [Electrochimica Acta 54 (2009) 5721-5726] disclose copper (hydr)oxide modified copper electrode for electrocatalytic oxidation of hydrazine in alkaline media. The modified electrode showed improved stability to corrosion and an improved electrochemical performance (a negative shift of about 120 mV as compared to a bare copper electrode). The disclosed Cu modified electrode, however, operates at a working potential of +0.2 V, which is not suitable for fuel cell applications (for fuel cell application an anode potential of at least −0.5 V is needed).

Some background art concerning interactions between hydrazine and copper(II) ions includes Zhiliang Jiang et al. [*Anal. Chem.* 2008, 80, 8681-8687], which report that Cu(II) ions serve as catalysts for homogenous Hz decomposition.

Fuel cell systems operating with hydrazine as a fuel and various oxidants have been taught. Commonly used oxidants include, for example, air (for oxygen supply), nitrous acid, and hydrogen peroxide.

U.S. Pat. No. 3,811,949 discloses a hydrazine-based fuel cell system comprising metal alloys (e.g., amalgams) as catalysts and oxygen as the oxidant. The main disadvantage in this fuel cell is the use of dangerous mercury-containing electrode.

Electrochemical hydrazine sensors were also developed in the last decades [see, for example, Abbaspour and Kamyabi; *J. Electroanal. Chem.* 2005, 576, 73-83; Ozoemena and Nyokong; *Talanta*, 2005, 162-168; Karim-Nezhad and Jafarloo, *Electrochimica Acta;* 2009, 54, 5721-5726]. These electrochemical sensors utilize as catalysts noble metals, transition metals, organic and inorganic complexes, oxides, metal phthalocyanides, metal porphyrines, and more.

Several publications have reported that $CuSO_4/Cu^{(II)}$ is an effective promoter for homogenous oxidation of hydrazine [see, for example, J. Ward, *J. Am. Chem. Soc.* 1976, 98, 7; J. Corey. *J. Am.; Chem. Soc.* 1961, 83, 2957; J. Rempel, *Appl. Catalysis A: General,* 2004, 263, 27; Z. Jiang. *Anal. Chem.* 2008, 80, 8681].

WO 2010/055512 describes fuel cell systems comprising an anode and/or cathode which comprise a non-noble metal (e.g., copper) or a non-metallic substance (e.g., an iron electron-transfer mediating complex) as a catalyst. The disclosed fuel cell systems are operable by ammonia borane or derivatives thereof as fuel and utilize a peroxide as an optional oxidant. Exemplary systems include an anode comprising a copper catalyst layer. Optionally, the cathode comprises a metallic complex as a catalyst layer.

WO 2010/055511 also describes fuel cell systems comprising an anode and/or cathode which comprises a non-noble metal (e.g., copper) or a non-metallic substance (e.g., an iron electron-transfer mediating complex) as a catalyst, which are operable by hydrazine or derivatives thereof as fuel. Exemplary systems include an anode comprising copper nanoparticles as a catalyst layer.

Additional background art includes U.S. Pat. Nos. 6,562,497; 6,554,877; 6,758,871, US 2003/0207157, and Yamada et al., *Electrochemistry Communications,* 2003, 5, 892-896.

SUMMARY OF THE INVENTION

According to an aspect of some embodiments of the present invention there is provided a fuel cell system comprising an anode compartment which comprises an anode having a copper catalyst layer, a cathode configured as an air cathode, and a separator interposed between the anode and the cathode, the fuel cell being operable by an amine-derived fuel and oxygen.

According to some embodiments of the present invention, the fuel cell system is characterized as producing an essentially stable electrical efficiency for at least 50 hours.

According to some embodiments of the present invention, the fuel cell system is characterized as producing an essentially stable electrical efficiency for at least 500 hours.

According to some embodiments of the present invention, the amine derived fuel comprises a compound having a formula: $R_1R_2R_3N-BR_4R_5R_6$, wherein each of $R_1$-$R_6$ is independently selected from the group consisting of hydrogen, alkyl, alkenyl, alkynyl, heteroalicyclic, alkoxy, and amine, provided that at least one of $R_4$, $R_5$ and $R_6$ is hydrogen.

According to some embodiments of the present invention, the amine-derived fuel comprises a compound having a formula: $R_7R_8N-NR_9R_{10}$, wherein each of $R_7$-$R_{10}$ is independently selected from the group consisting of hydrogen, alkyl, alkenyl, alkynyl, hydrazide and amine, provided that at least one of $R_7$-$R_{10}$ is hydrogen.

According to some embodiments of the present invention, the amine-derived fuel is selected from the group consisting of:

a compound having a formula: $R_1R_2R_3N-BR_4R_5R_6$, wherein each of $R_1$-$R_6$ is independently selected from the group consisting of hydrogen, alkyl, alkenyl, alkynyl, heteroalicyclic, alkoxy, and amine, provided that at least one of $R_4$, $R_5$ and $R_6$ is hydrogen;

a compound having a formula: $R_7R_8N-NR_9R_{10}$, wherein each of $R_7$-$R_{10}$ is independently selected from the group consisting of hydrogen, alkyl, alkenyl, alkynyl, hydrazide and amine, provided that at least one of $R_7$-$R_{10}$ is hydrogen; and a mixture of the compound having a formula: $R_1R_2R_3N-BR_4R_5R_6$ and the compound having a formula: $R_7R_8N-NR_9R_{10}$.

According to some embodiments of the present invention, the fuel comprises the mixture of the compound having a formula: $R_1R_2R_3N-BR_4R_5R_6$ and the compound having a formula: $R_7R_8N-NR_9R_{10}$.

According to some embodiments of the present invention, a mole ratio of the compound having a formula: $R_1R_2R_3N-BR_4R_5R_6$ and the compound having a formula: $R_7R_8N-NR_9R_{10}$ ranges from 200:1 to 1:200.

According to some embodiments of the present invention, the air cathode comprises a $MnO_2$ catalyst layer.

According to some embodiments of the present invention, the air cathode comprises a metal complex.

According to some embodiments of the present invention, the metal complex is a cobalt porphyrin complex.

According to some embodiments of the present invention, the separator is deposited onto the air cathode.

According to some embodiments of the present invention, the separator is a hydroxide-permeable membrane.

According to some embodiments of the present invention, the separator comprises one or more polymers and/or copolymers.

According to some embodiments of the present invention, the separator comprises poly(vinyl alcohol-co-ethylene).

According to some embodiments of the present invention, the separator further comprises polyethylene glycol (PEG).

According to some embodiments of the present invention, the separator further comprises a cross-linking agent.

According to an aspect of some embodiments of the present invention there is provided a fuel cell system comprising an anode compartment, a cathode and a separator interposed therebetween, the anode compartment comprising an anode having a catalyst layer that comprises copper, the cathode is configured as an air cathode (e.g., an air cathode having a catalyst layer containing $MnO_2$), and the separator comprising poly(vinyl alcohol-co-ethylene), the fuel cell system being operable by an amine-derived fuel which comprises a compound selected from the group consisting of:

a compound having a formula: $R_1R_2R_3N-BR_4R_5R_6$, wherein each of $R_1$-$R_6$ is independently selected from the group consisting of hydrogen, alkyl, alkenyl, alkynyl, heteroalicyclic, alkoxy, and amine, provided that at least one of $R_4$, $R_5$ and $R_6$ is hydrogen;

a compound having a formula: $R_7R_8N$—$NR_9R_{10}$, wherein each of $R_7$-$R_{10}$ is independently selected from the group consisting of hydrogen, alkyl, alkenyl, alkynyl, hydrazide and amine, provided that at least one of $R_7$-$R_{10}$ is hydrogen; and a mixture of the compound having a formula: $R_1R_2R_3N$—$BR_4R_5R_6$ and the compound having a formula: $R_7R_8N$—$NR_9R_{10}$.

According to some embodiments of the present invention, the fuel comprises the mixture of the compound having a formula: $R_1R_2R_3N$—$BR_4R_5R_6$ and the compound having a formula: $R_7R_8N$—$NR_9R_{10}$.

According to some embodiments of the present invention, a mole ratio of the compound having a formula: $R_1R_2R_3N$—$BR_4R_5R_6$ and the compound having a formula: $R_7R_8N$—$NR_9R_{10}$ ranges from 200:1 to 1:200.

According to some embodiments of the present invention, any of the fuel cell systems described herein is operable by contacting the anode with the fuel and contacting the cathode with oxygen.

According to some embodiments of the present invention, any of the fuel cell systems described herein is operable by contacting the anode with the fuel and contacting the cathode with air.

According to an aspect of some embodiments of the present invention there is provided a method of operating the fuel cell system as described herein, the method comprising:

contacting the anode compartment with an anode solution that comprises the amine-derived fuel;

contacting the cathode with oxygen; and electrochemically reacting the fuel and the oxygen.

According to an aspect of some embodiments of the present invention there is provided a method of operating the fuel cell system, the method comprising:

contacting the anode compartment with an anode solution that comprises the amine-derived fuel;

contacting the cathode with air; and electrochemically reacting the fuel and oxygen in the air.

According to an aspect of some embodiments of the present invention there is provided a fuel cell system comprising an anode compartment which comprises an anode having a copper catalyst layer, a cathode (optionally comprised in a cathode compartment) and a separator interposed therebetween, the fuel cell being operable by a fuel which comprises a mixture of:

a compound having the formula: $R_1R_2R_3N$—$BR_4R_5R_6$, wherein each of $R_1$-$R_6$ is independently selected from the group consisting of hydrogen, alkyl, alkenyl, alkynyl, heteroalicyclic, alkoxy, and amine, provided that at least one of $R_4$, $R_5$ and $R_6$ is hydrogen; and a compound having a formula: $R_7R_8N$—$NR_9R_{10}$, wherein each of $R_7$-$R_{10}$ is independently selected from the group consisting of hydrogen, alkyl, alkenyl, alkynyl, hydrazide and amine, provided that at least one of $R_7$-$R_{10}$ is hydrogen.

According to some embodiments of the present invention, the fuel cell system is being operable by contacting the anode with the fuel and contacting the cathode with an oxidant.

According to some embodiments of the present invention, the oxidant comprises a peroxide.

According to some embodiments of the present invention, the oxidant comprises oxygen.

According to some embodiments of the present invention, the cathode is configured as an air cathode.

According to some embodiments of the present invention, each of $R_1$-$R_6$ is hydrogen.

According to some embodiments of the present invention, each of $R_7$-$R_{10}$ is hydrogen.

According to some embodiments of the present invention, the fuel comprises an alkaline aqueous solution of the mixture.

According to some embodiments of the present invention, a mole ratio between the compound having a formula: $R_1R_2R_3N$—$BR_4R_5R_6$ and the compound having a formula: $R_7R_8N$—$NR_9R_{10}$ ranges from 200:1 to 1:200.

According to some embodiments of the present invention, the mole ratio ranges from 1:1 to 1:10.

According to some embodiments of the present invention, the separator comprises a solid electrolyte membrane.

According to an aspect of some embodiments of the present invention there is provided an electricity-consuming device comprising any of the fuel cell systems described herein.

According to an aspect of some embodiments of the present invention there is provided a vehicle, fueled by any of the fuel cell systems described herein.

According to an aspect of some embodiments of the present invention there is provided a method of powering an electricity-consuming device, the method comprising powering the electricity-consuming device with any of the fuel cell systems described herein.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a schematic illustration of a fuel cell, according to various exemplary embodiments of the present invention.

Figure 2A:
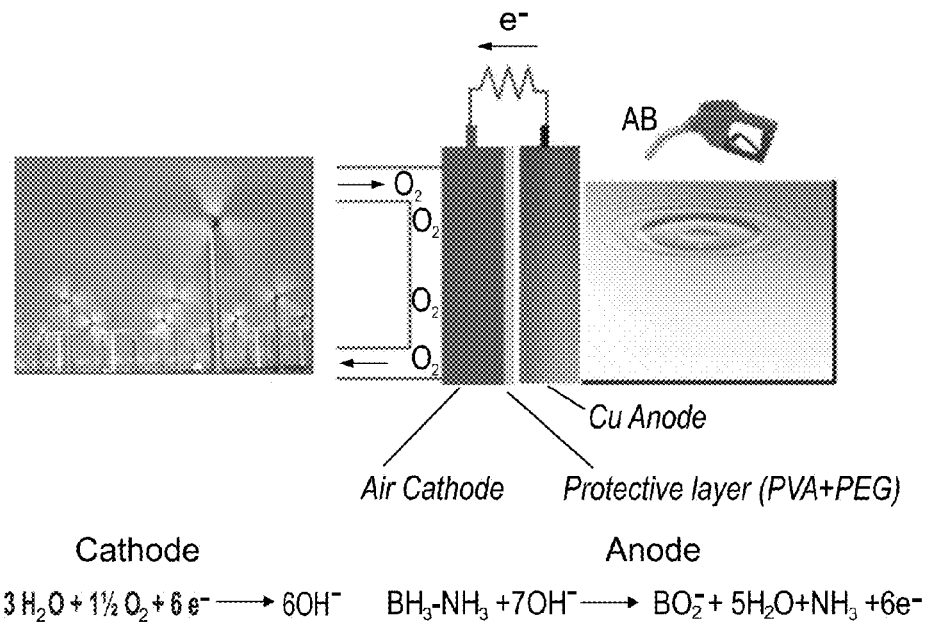

FIG. 2A presents an illustration of an exemplary fuel cell system operable by ammonia borane as a fuel and $O_2$/air as an oxidant, according to some exemplary embodiments of the invention.

Figure 2B:
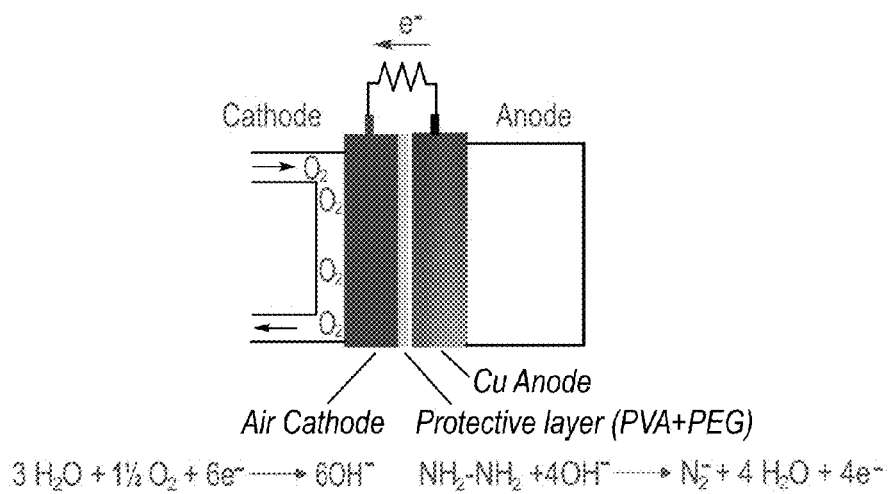

FIG. 2B presents a schematic illustration of an exemplary hydrazine (Hz)/$O_2$ fuel cell system according to some exemplary embodiments of the invention.

Figure 3A:
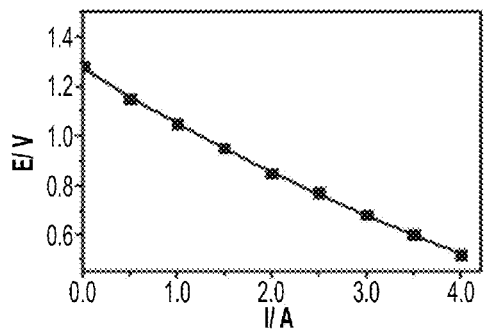
Figure 3B:
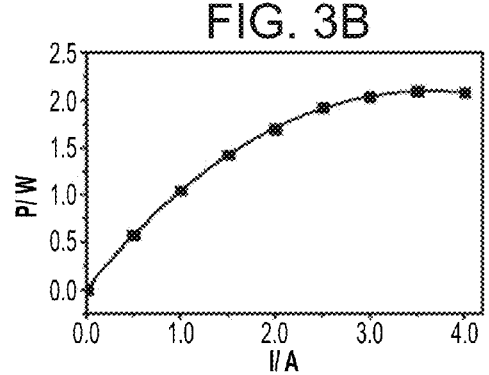
Figure 3C:
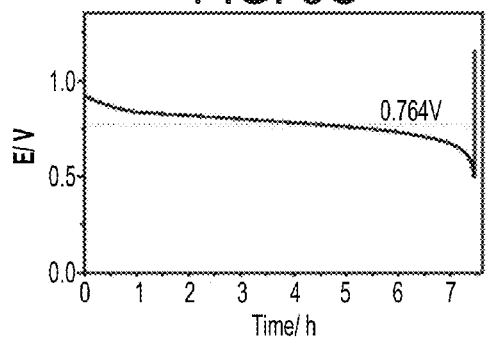

FIGS. 3A-C present the data obtained for an AB/$O_2$ fuel cell system (6×10×2.5 cm in size), containing a Cu-mesh anode and a commercial air cathode, when contacted with an anode composition containing 50 ml of 2 M (3 grams)

ammonia borane (AB) in 6 M KOH+4.2 grams solid KOH. FIG. 3A is a graph presenting E vs. I (derived from a galvanostatic-step experiment, 20 seconds for each current); FIG. 3B is a graph showing the calculated power vs. current; and FIG. 3C is a graph presenting the complete discharge at 1 A.

Figure 4A:
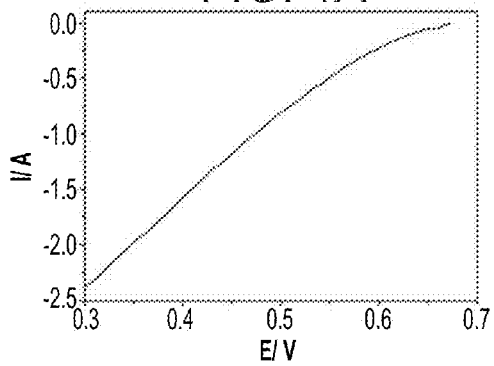
Figure 4B:
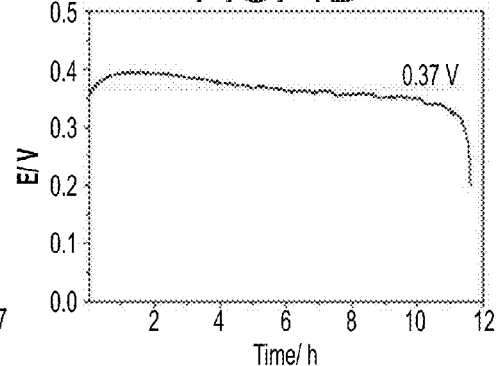

FIGS. 4A-B present the results obtained for a Hz/$O_2$ fuel cell system (6×10×2.5 cm in size), containing a commercial air cathode and a Cu-mesh anode in an anode solution containing 25 ml of 65% w/v hydrazine (16.25 grams) and 25 ml 6 M KOH+4.2 grams solid KOH. FIG. 4A is a graph presenting the voltammetric properties of the fuel cell (LSV), at a scan rate of 20 mV·$s^{-1}$. FIG. 4B is a graph presenting the complete discharge at 1 A.

Figure 5:
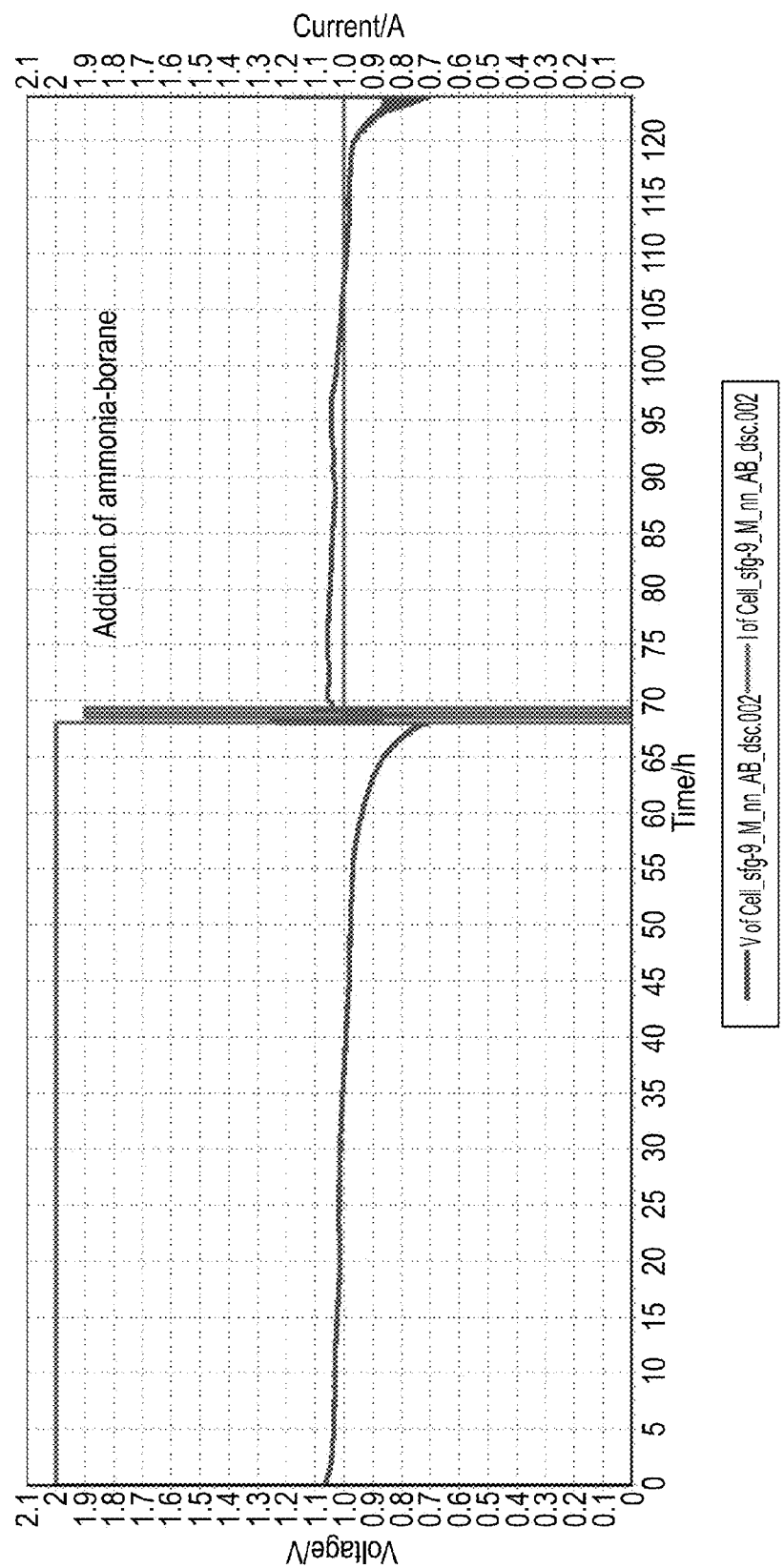

FIG. 5 presents long discharge curves for an ammonia borane/air fuel cell (having a geometrical area of 70 $cm^2$), containing a commercial air cathode and a Cu-mesh anode, operated by setting the current on 2 A and while continuously flowing a 100 ml anode solution (20 ml/minute) containing 2% ammonia borane in 6M KOH, and then operated by setting the current on 1 A while continuously flowing an additional 100 ml anode solution.

Figure 6A:
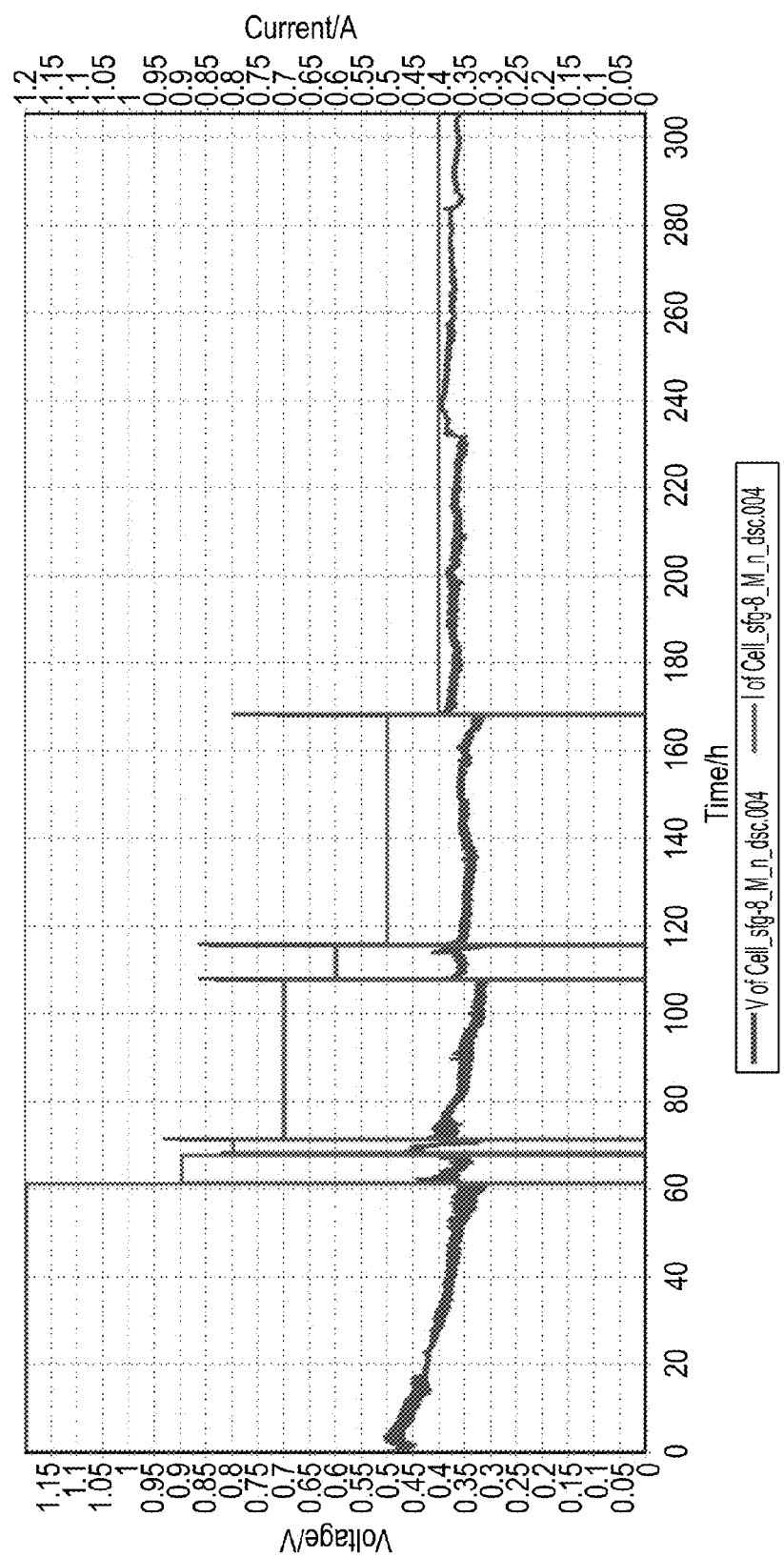
Figure 6B:
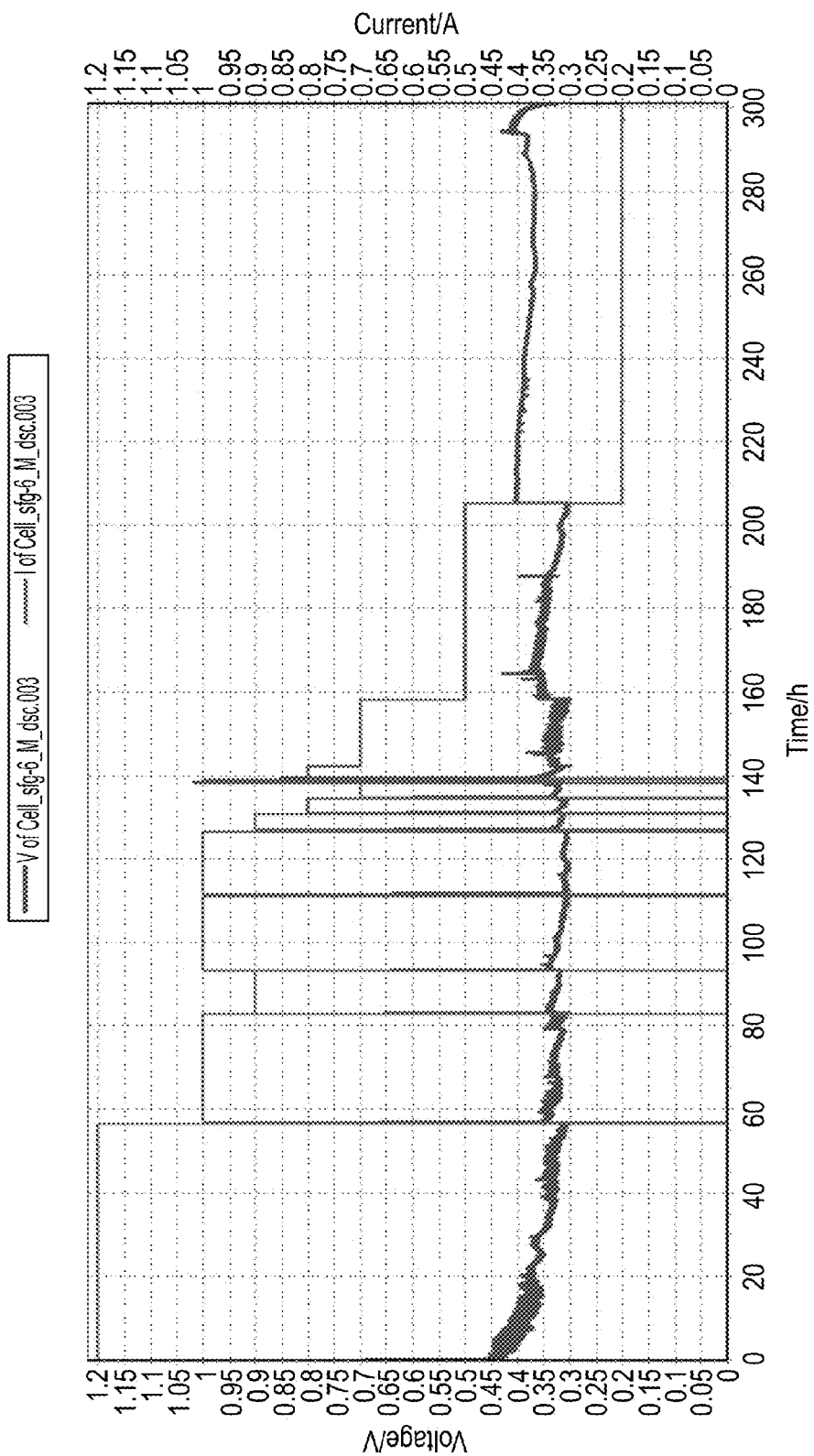

FIGS. 6A-B present long discharge curves for an hydrazine/air fuel cell (having a geometrical area of 70 $cm^2$), containing a commercial air cathode and a Cu-mesh anode, operated by setting an initial current of 1.2 A while continuously flowing a 100 ml anode solution (20 ml/minute) containing 2% hydrazine in 6M KOH, and then operated at various galvanostatic regimens, as detailed in Example 3 hereinbelow.

Figure 7:
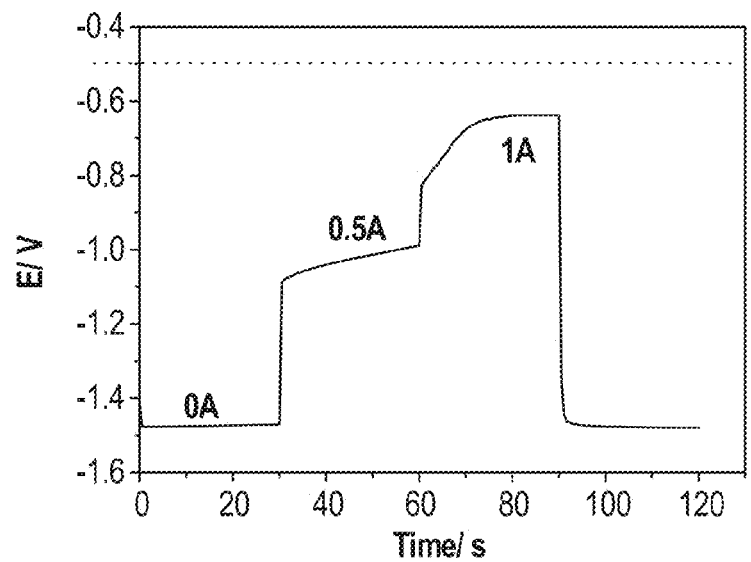

FIG. 7 presents the produced voltage at galvanostatic stairs for a half-cell containing Cu-mesh electrode (A=1.25 $cm^2$, folded 4 times) and Ag|AgCl (sat. KCl) as reference electrode, operated with ammonia borane and hydrazine mixture (1:1 mole) as fuel (with the maximum potential defined as −0.5V).

Figure 8:
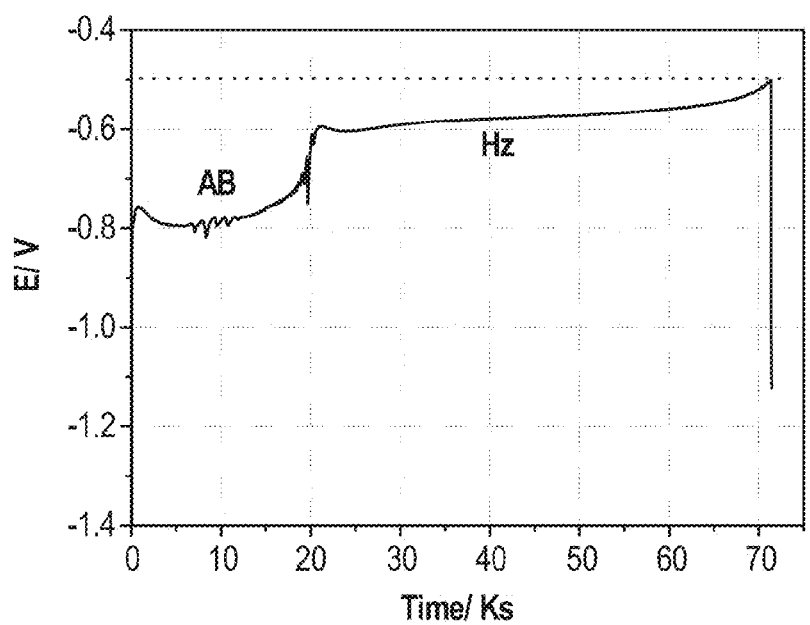

FIG. 8 presents discharge at 1 A of a half-cell containing Cu-mesh electrode (A=1.25 $cm^2$, folded 4 times) and Ag|AgCl (sat. KCl) as reference electrode, operated with ammonia borane and hydrazine mixture (1:1 mole ratio) as fuel (with the maximum potential defined as −0.5V).

Figure 9:
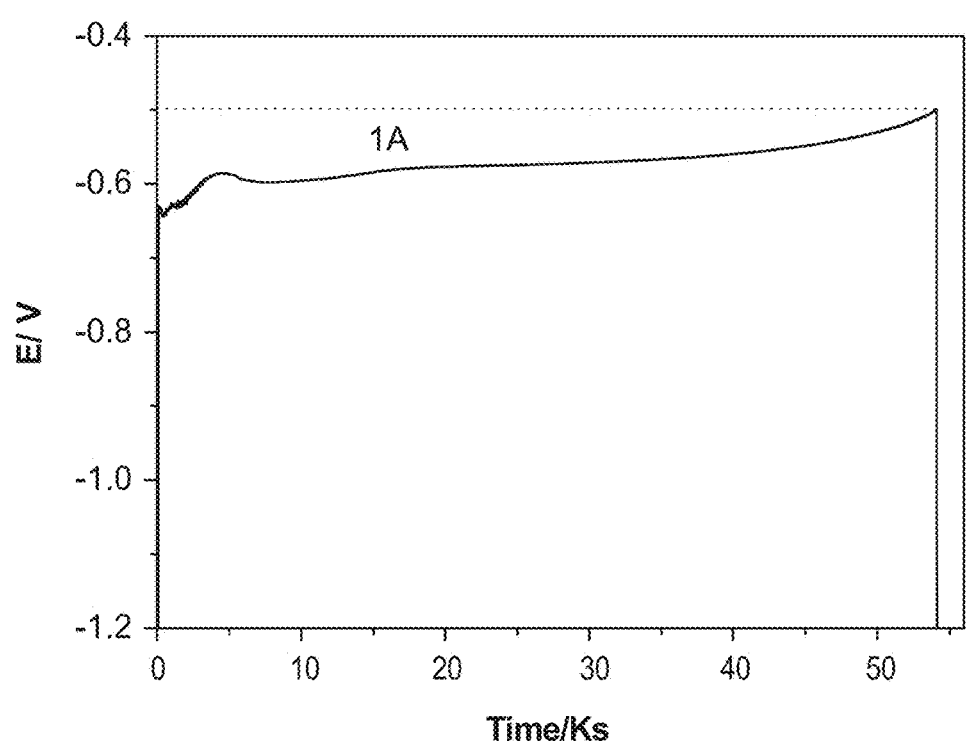

FIG. 9 presents discharge at 1 A of a half-cell containing Cu-mesh electrode (A=1.25 $cm^2$, folded 4 times) and Ag|AgCl (sat. KCl) as reference electrode, operated with ammonia borane and hydrazine mixture (1:8 mole ratio) as fuel (with the maximum potential defined as −0.5V).

Figures 10A, 10B, 10C:
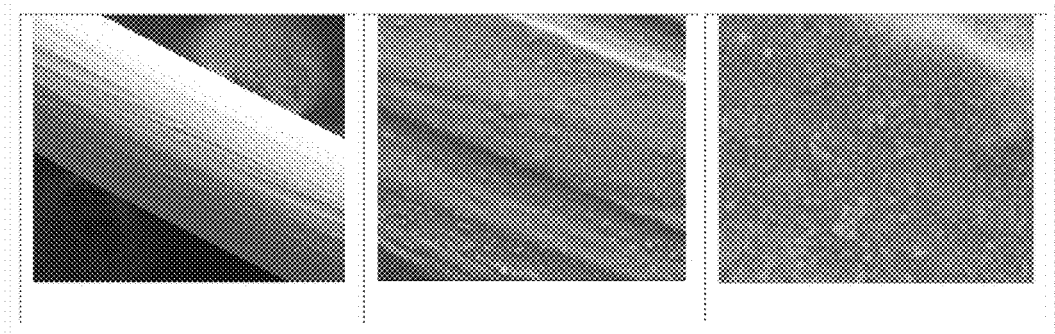

FIGS. 10A-C present SEM images of a Cu-mesh electrode (A=1.25 $cm^2$, folded 4 times) following a galvanostatic regime of 1 A for 5 hours, with a fuel composition containing 0.1M AB+0.9 M Hz in 6M KOH, at a 100 µm scale (FIG. 10A); 20 µm scale (FIG. 10B); and 5 µm scale (FIG. 10C).

Figures 11A, 11B, 11C:
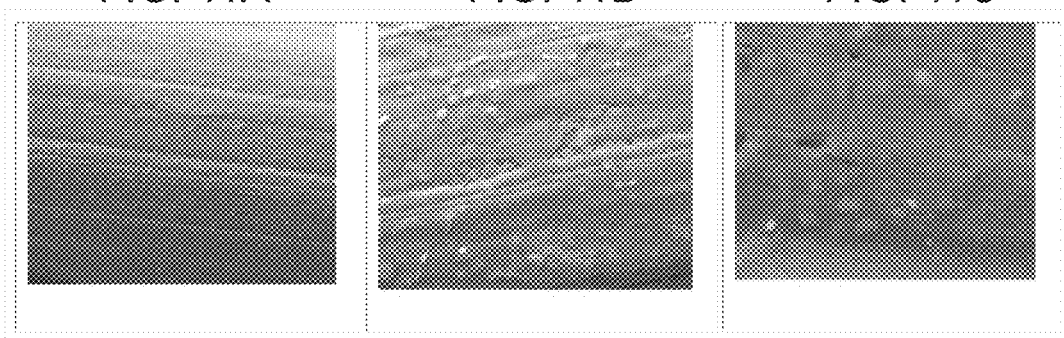

FIGS. 11A-C present SEM images of a Cu-mesh electrode (A=1.25 $cm^2$, folded 4 times) following a galvanostatic regime of 1 A for 5 hours, with a fuel composition containing 0.5M ammonia borane in 6M KOH, at a 100 µm scale (FIG. 11A); 20 µm scale (FIG. 11B); and 5 µm scale (FIG. 11C).

Figures 12A, 12B, 12C:
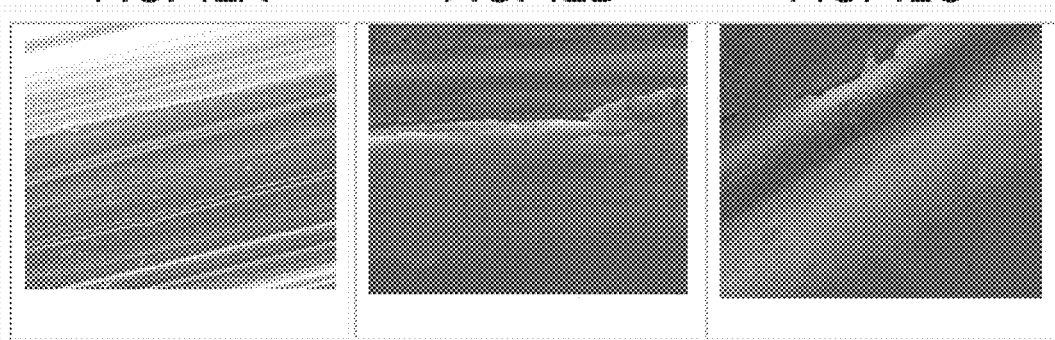

FIGS. 12A-C present SEM images of untreated Cu-mesh electrode (A=1.25 $cm^2$, folded 4 times), at a 100 µm scale (FIG. 10A); 20 µm scale (FIG. 10B); and 5 µm scale (FIG. 10C).

DESCRIPTION OF SPECIFIC EMBODIMENTS OF THE INVENTION

The present invention, in some embodiments thereof, relates to energy conversion and, more particularly, but not exclusively, to a direct liquid fuel cell system, which utilizes ammonia borane, hydrazine or derivatives thereof, or mixtures of the same, as fuel, and to applications employing such a fuel cell system.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present inventors previously demonstrated that copper catalysts act as efficient catalyst layers of anodes utilized for the direct electro-oxidation of a family of amine-derived fuels. A series of amine-derived fuels, e.g. ammonia-borane (AB), hydrazine and hydrazine sulfate, was tested and found to be efficiently oxidized at high yields in the presence of copper catalyst-containing anode, when utilized with a peroxide-containing solution as an oxidant.

The present inventors have now surprisingly uncovered that copper catalyst-containing anodes can be employed in fuel cell systems operable by amine-derived fuels, such as those described hereinabove, when utilized with air cathodes (configured to utilize gaseous oxygen, e.g., from air, as an oxidant), and can be as efficient as with peroxide-containing solutions.

Such fuel cell systems thus utilize available, safe and low-cost components, while efficiently acting as power source.

Exemplary fuel cells are described in the Examples section that follows. The practiced fuel cells showed high electrical efficiency for long periods of continuous operation (e.g., more than 500 hours). The practiced fuel cells efficiently performed with various air cathodes (having different catalysts) and with various solid membrane separators. A fuel cell system containing a uniquely designed solid membrane separator was also practiced.

The present inventors have further uncovered that utilizing, as a fuel, a mixture of ammonia borane and hydrazine, each at a relative concentration of 0.1 to 99.9%, results in highly efficient fuel cells, with electric efficiency of more than 40%, and even more than 50%.

Embodiments of the present invention therefore relate to fuel cell systems, operable by contacting the anode with amide-derived fuel and contacting the cathode with gaseous oxygen (e.g., with air).

Embodiments of the present invention also relate to fuel cell systems which are operable by a fuel which is a mixture of ammonia borane (or a derivative, a salt, a hydrate or a solvate thereof) and hydrazine (or a derivative, a salt, a hydrate or a solvate thereof).

I. Fuel Cell Systems Operable by an Amine-Derived Fuel and Oxygen:

According to an aspect of some embodiments of the present invention there is provided a fuel cell system comprising an anode compartment which comprises an anode having a copper catalyst layer, a cathode configured as an air cathode and a separator interposed between said anode and said cathode, the fuel cell being operable by an amine-derived fuel and oxygen.

The fuel cell system is operable by contacting the anode with the amine-derived fuel (e.g., with a fuel composition containing one or more amine-derived compound) and contacting the cathode with oxygen (e.g., gaseous oxygen such as oxygen found in air (atmospheric oxygen)).

In some embodiments, the fuel cell system is operable by contacting the anode with the amine-derived fuel (e.g., with a fuel composition containing one or more amine-derived compounds) and contacting the cathode with air.

In some embodiments, the fuel cell system according to this aspect of embodiments of the invention is characterized by high electrical stability. In some embodiments, the fuel cell system is characterized as producing an essentially stable electrical efficiency for more than 50 hours, 100 hours, more than 200 hours, more than 300 hours, more than 400 hours and even more than 500 hours, when operated by the amine-derived fuel.

By "essentially stable" it is meant that the electrical efficiency of the cell changes by no more than 5% during operation the indicated time period.

In some embodiments, the fuel cell system according to this aspect of embodiments of the invention exhibits, when operated by the amine-derived fuel, an open circuit potential ($E_{OCP}$) higher than 0.5 Volt, higher than 0.7 Volt, higher than 1 Volt and even higher than 1.2 Volts, depending on the fuel. In some embodiments, the open circuit potential ($E_{OCP}$) ranges from 0.5 V to 1.5V.

In some embodiments, a fuel cell system as described herein exhibits, when operated by the amine-derived fuel, a power output (W) that ranges from about 5 mWatt/cm$^2$ to about 40 Watt/cm$^2$. In some embodiments, the power output is greater than 10 mWatt/cm$^2$, greater than 20, mWatt/cm$^2$, greater than mWatt/cm$^2$, and can be also greater than 100 mWatt/cm$^2$. Higher power outputs are also contemplated.

In some embodiments, a fuel cell as described herein exhibits a high discharge potential. For example, the fuel cell exhibits a discharge potential that ranges from about 0.1 V to about 1.5 V, at a current density of 20 mA/cm$^2$. In some embodiments, the fuel cell system exhibits, when operated, a discharge potential that equals or is greater than 1 V. Higher discharge potential values are also contemplated.

In some embodiments, a fuel cell as described herein produces high current. For example, the fuel cell exhibits a current density that ranges from about 0.1 mA/cm$^2$ to about 2 A/cm$^2$. In some embodiments, the current density ranges from 7 mA/cm$^2$ to 50 mA/cm$^2$. Higher current density values are also contemplated.

The Fuel Cell System:

A fuel cell system as described herein generally comprises an anode compartment, a cathode and a separator.

The anode compartment comprises an anode and, when the fuel cell is operated, a liquid fuel composition is at least partially filling it, such that the anode or part thereof (e.g., the lower part) is kept in contact with the liquid fuel composition at all times. The anode comprises an electrode and a catalyst layer, which is typically deposited on the surface of electrode, preferably at the part which is in contact with the fuel composition.

Figure 1:
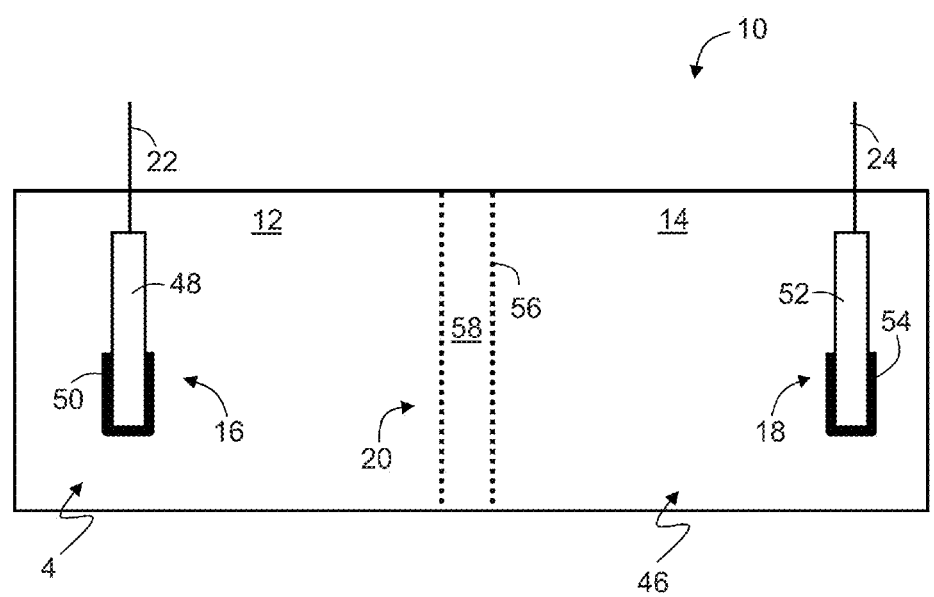

Referring now to the drawings, FIG. 1 generally illustrates a fuel cell system 10 according to some embodiments of the invention. In the representative example illustrated in FIG. 1 fuel cell system 10 is made-up of an anode compartment 12 and cathode compartment 14. Fuel cell system 10 generally comprises anode compartment 12, cathode compartment 14 and separator 20.

Anode compartment 12 comprises an anode 16 and, when the system is operated, a liquid fuel composition 44 at least partially fills compartment 12. Anode 16 or part thereof (e.g., the lower part) is kept in contact with liquid fuel composition 44 during operation of the fuel cell system. Anode 16 comprises an electrode 48 and a catalyst layer 50, which is typically deposited on or found on the surface of electrode 48, preferably at the part which is in contact with fuel composition 44.

Since the electric energy is generated in anode compartment 12, it is desired to have an anode with a catalyst layer that has a high surface area.

Herein throughout, an electrode (anode or cathode) that comprises a catalyst layer is also referred to as a catalyst-containing electrode. Thus, in various exemplary embodiments of the invention, anode 16 is a catalyst-containing electrode, and in some embodiments, anode 16 is a copper catalyst-containing electrode.

Fuel composition 44, according to some embodiments of the invention, comprises an ammonia borane and/or a derivative thereof, hydrazine and/or a derivative thereof, or a mixture of the above, as described herein, dissolved or suspended in an aqueous solution (e.g., an anode electrolyte solution). In these embodiments, the aqueous solution preferably comprises an alkaline substance such as, for example, a metal alkali hydroxide, as discussed in detail hereinunder.

Hereinthroughout, the expressions "fuel", "fuel composition", "anode composition", "anode electrolye", "anode electrolyte solution" and "anode solution" are used interchangeably.

Cathode compartment 14 comprises a cathode 18 and, when the fuel cell system is operated, comprises an oxidant 46 at least partially contacting cathode 18. Cathode 18 or part thereof is kept in contact with the oxidant during operation of the cell. Cathode 18 comprises an electrode 52 and a catalyst layer 54. Catalyst layer 54 is typically deposited on the surface of electrode 52, preferably on the part which is in contact with oxidant 46.

The oxidant of the present embodiments comprises gaseous oxygen (e.g., $O_2$ in atmospheric air). Thus, in some embodiments, the cathode compartment further comprises a means for introducing the oxidant, such as, for example, a fan or an air pump (not shown). When the fuel cell system is operated, the cathode or part thereof is kept in contact with the air (or oxygen) at all times. In some embodiments, cathode compartment 14 comprises a cathode electrolyte. When the fuel cell system is operated, and the oxidant is introduced into cathode compartment 14, and an oxidant composition comprising oxidant 46 is formed.

The cathode electrolyte, in some embodiments, is a fluid electrolyte, namely, can be in a liquid or gaseous form.

In some embodiments, the cathode electrolyte is a cathode electrolyte solution, such as, for example, an aqueous solution (e.g., water).

In some embodiments, gaseous oxidant 46 diffuses or dissolves in the electrolyte solution so as to form an oxidant composition.

In some embodiments, humidified oxygen is used as the oxidant, thus forming an oxidant composition in a gaseous form.

In some embodiments, cathode compartment 14 is configured such that cathode 18 can be in contact with atmospheric air (as a source of oxidant 46). In come embodiments, cathode compartment 14 is at least partially opened so as to allow cathode 18 to contact atmospheric air.

In some embodiments, fuel cell 10 does not comprise cathode compartment 14, and comprises only cathode 18 which, in some embodiments, when the fuel cell is operated, is in communication with atmospheric air so as to allow cathode 18 to contact oxidant 46.

In some embodiments, cathode 18 is referred to herein as an "air cathode".

In some embodiments of the present invention separator 20 comprises a solid separator 56 and an electrolyte membrane 58. The separator can be ionically conductive or non-conductive, as desired. When ionically conductive, the separator can be conductive for cations, anions or both. In various exemplary embodiments of the invention the separator is ionically-conductive and is electrically non-conductive, as is further detailed hereinbelow.

In some embodiments, separator 20 comprises electrolyte membrane 58 deposited onto a part of the surface of cathode 18 and serving as a protecting layer that prevents contact between the anode compartment and cathode 18. In some embodiments, separator 20 consists of electrolyte membrane 58.

In some embodiments, electrolyte membrane 58 is deposited onto cathode 18 in a manner that does not interfere with contacting cathode 18 with oxidant 46.

In various exemplary embodiments of the invention fuel cell 10 further comprises electrical leads 22 and 24 for connecting electrodes 16 and 18 to an electric load (not shown) so as to supply electrical energy thereto. Upon such connection, electrons begin to flow from electrode 16 via the electric load to electrode 18. The electrical current flowing in the thus closed electrical circuit can be measured and optionally monitored using a current measuring device connected in serial to the electric load (not shown). Other parameters, such as voltage, can also be measured, if desired, as known in the art.

Thus, in various exemplary embodiments of the invention the fuel cell system further comprises electrical leads for connecting the electrodes (anode and cathode) to an electric load. In some embodiments, the electrical leads supply electrical energy to the electric load.

During the electrochemical reaction within anode compartment 12, hydrogen gas (and optionally other gases) may be produced as side product, as a result of a chemical side reaction that involves dehydrogenation of the fuel and results in hydrogen generation. Gaseous ammonia and/or gaseous nitrogen can also be formed during operation of the fuel cell, depending on the fuel composition used. In some embodiments of the invention fuel cell system 10 further comprises a gas outlet (not shown), for allowing evacuation of the hydrogen gas and/or other gases out of anode compartment 12. The hydrogen gas can be used as a fuel component, for example, in a hydrogen-driven engine (not shown) or the like. Thus, in some embodiments of the present invention the hydrogen gas is conveyed, e.g., by means of a gas convey tube (not shown), to the engine or any other external location.

Optionally and preferably, the electrochemical reaction within compartment 12 is monitored, for example, by means of an electrochemical unit (not shown) located in compartment 12. The electrochemical unit can comprise a catalyst layer suitable for the electrochemical process occurring in the fuel cell. The catalyst can be identical or different from the catalyst layer of anode 16. The electrochemical unit can be configured to measure any parameter pertaining to the operation and/or state of cell 10. These include, without limitation, $E_{OCP}$, which is indicative of the fuel concentration and/or viscosity, and the like. Electrical signals generated by the electrochemical unit can be transmitted, e.g., via a communication line (not shown) to a remote location (not shown).

In some embodiments, a fuel cell system, as described herein, further comprises a chamber for supplying the fuel to the anode compartment, which is operatively connected to the anode compartment and is configured to provide the fuel composition to the anode. In some embodiments, the fuel cell system further comprises a chamber for supplying the oxidant to the cathode compartment, which is operatively connected to the cathode compartment and is configured to provide the oxidant to the cathode.

The nature and characteristics of the anode, cathode, catalyst layers, oxidants, solutions and separators, as well as of other components that can be added to the anode and/or cathode compartments, or to the system as a whole, are further detailed hereinbelow.

The distances between the anode, cathode, separator, fuel cell walls, and other components can be manipulated and are generally as would be recognized by a person skilled in the art.

An exemplary embodiment of a fuel cell system as disclosed herein, operable with ammonia borane as an amine-derived fuel, is illustrated in FIG. 2A. It is to be understood that although the description below is with reference to FIG. 2A, any of the described embodiments can be independently incorporated in the fuel cell system as described above and illustrated in FIG. 1. Similarly, it is to be understood that any of the embodiments described above and illustrated in FIG. 1 can be independently incorporated in the fuel cell system illustrated in FIG. 2A.

In the exemplary embodiment illustrated in FIG. 2A, the fuel cell system comprises an anode compartment, which comprises a copper catalyst-containing anode, also referred to herein as copper anode or Cu anode, an air cathode and an electrolyte membrane (also referred to herein as a protective layer) made of PVA and PEG is deposited onto the air cathode.

The exemplary fuel cell system illustrated in FIG. 2A is operable upon contacting the anode with ammonia borane as an amine-derived fuel and contacting the air cathode with atmospheric oxygen (oxygen found in air). The fuel is oxidized upon contacting the anode, and the produced electrons flow, via electric leads that connect the anode and the cathode, to the cathode, where the oxidant is reduced (see arrow in FIG. 2A and chemical equations describing the electrochemical reactions performed in the fuel cell system therein).

Another exemplary embodiment of a fuel cell system, operable with hydrazine as an amine-derived fuel is illustrated in FIG. 2B. It is to be understood that although the description below is with reference to FIG. 2B, any of the described embodiments can be independently incorporated in the fuel cell system as described above and illustrated in FIG. 1. Similarly, it is to be understood that any of the embodiments described above and illustrated in FIG. 1 can be independently incorporated in the fuel cell system illustrated in FIG. 2B.

In the exemplary embodiment illustrated in FIG. 2B, the fuel cell system comprises an anode compartment, which comprises a copper catalyst-containing anode, also referred to herein as copper anode or Cu anode, an air cathode and an electrolyte membrane (also referred to as a protective layer) made of PVA and PEG is deposited onto the air cathode.

The exemplary fuel cell system illustrated in FIG. 2B is operable upon contacting the anode with hydrazine as an amine-derived fuel and contacting the air cathode with atmospheric oxygen. The fuel is oxidized upon contacting the anode, and the produced electrons flow, via electric leads that connect the anode and the cathode, to the cathode, where the oxidant is reduced (see arrow in FIG. 2B and chemical equations describing the electrochemical reactions performed in the fuel cell system therein).

In some embodiments, the fuel cell system comprises an anode having a copper catalyst layer, preferably, in a form of a mesh; an air cathode which comprises a $MnO_2$ catalyst (such as, for example, described hereinbelow); and a separator partially coating (or being deposited onto a part of) the air cathode.

In some embodiments, the fuel cell system comprises an anode having a copper catalyst layer, preferably, in a form of a mesh; an air cathode which comprises a metal complex catalyst (e.g., a cobalt porphyrin complex such as described hereinbelow); and a separator partially coating (or being deposited onto a part of) the air cathode.

In some embodiments, the fuel cell system comprises an anode having a copper catalyst layer, preferably, in a form of a mesh; an air cathode which comprises a $MnO_2$ catalyst (such as, for example, described hereinbelow); and a separator partially coating (or being deposited onto a part of) the air cathode, the separator being a protecting membrane made from polyethylene glycol and poly(vinyl alcohol-co-ethylene) (such as, for example, described hereinbelow and illustrated in FIGS. 2A and 2B).

In some embodiments, the fuel cell system comprises an anode having a copper catalyst layer, preferably, in a form of a mesh; an air cathode which comprises a metal complex catalyst (e.g., a cobalt porphyrin complex such as described hereinbelow); and a separator partially coating (or being deposited onto a part of) the air cathode, the separator being a membrane made from polyethylene glycol and poly(vinyl alcohol-co-ethylene) (such as, for example, described hereinbelow and illustrated in FIGS. 2A and 2B).

In some embodiments, the fuel cell system comprises an anode having a copper catalyst layer, preferably, in a form of a mesh; an air cathode which comprises a metal complex catalyst (e.g., a cobalt porphyrin complex such as described hereinbelow); and a separator partially coating (or being deposited onto a part of) the air cathode, the separator being a commercially available hydroxide ion exchange membrane (e.g., obtained from Fumatch).

In some embodiments, the fuel cell system comprises an anode having a copper catalyst layer, preferably, in a form of a mesh; an air cathode as described herein; and a separator partially coating (or being deposited onto a part of) the air cathode, the separator being a hydroxide-ion exchange polymeric membrane (such as, for example, described hereinbelow and illustrated in FIGS. 2A and 2B).

In some embodiments, the fuel cell system comprises an anode having a copper catalyst layer, preferably, in a form of a mesh; a commercially available air cathode (such as, for example, described hereinbelow); and a separator partially coating (or being deposited onto a part of) the air cathode, such as, for example, described hereinbelow.

In any of the fuel cell systems described herein, the electrodes composing the anode and cathode are made of a conductive material, such as carbon, graphite, ceramics, conductive polymers, conductive metals, etc. The conductive material can be utilized as a coating of a support material, or can compose the electrode. An electric-insulating layer which coats a part of the electrode that does not have the catalyst layer deposited thereon is optional.

In some embodiments, a gas-impermeable layer is deposited on the catalyst layer of the anode or on the entire anode electrode.

In some embodiments, a gas-permeable layer is deposited on the catalyst layer of the cathode or on the entire cathode electrode. In some embodiments, such a gas-permeable layer is a highly-porous layer.

Exemplary support materials onto which the catalyst layer is deposited, so as to form the anode or the cathode, include carbon support materials, such as, but not limited to, carbon cloth, carbon foil, carbon felt, carbon paper, and glassy carbon, as well as graphite rods, granules, or reticulated vitreous carbon (RVC); nickel meshes; nickel foams; and stainless steel nets.

In some embodiments, the electrode used as an anode or a cathode is made of the material used as a catalyst layer. The catalyst layer material can be utilized as a coating of a support material, or can compose the electrode.

The electrodes can be commercially available electrodes or can be prepared or modified as desired.

In some embodiments, the anode and/or the cathode is a chemically modified electrode, namely, an electrode made of a suitable conductive material, as described herein, which is further modified by reacting it with, for example, amine-containing and/or sulfur containing compounds. Non-limiting examples include substituted or non-substituted aniline or pyridine.

Chemically modified electrodes can be obtained from a commercial vendor or can be prepared as desired.

In some embodiments, chemical modification of the electrode(s) is made in order to prevent undesired reactions.

For example, when hydrazine or a derivative thereof is used as fuel, a side reaction in which hydrazine is decomposed so as to produce nitrogen and hydrogen can occur in the anode compartment. When ammonia borane or a derivative thereof is used as fuel, a side reaction in which ammonia borane is dehydrogenated so as to produce hydrogen can occur in the anode compartment. Evolution of gaseous ammonia can also occur.

These reactions are undesired as they are chemically destroying reactions, in which some of the fuel irreversibly reacts chemically, which leads to a decrease in the fuel concentration and hence to a decreased efficiency of the cell. These reactions are further undesired since the evolution of gas may reduce the cell efficiency.

Thus, in some embodiments, the anode is chemically modified by agents which are known to inhibit the above-described chemically destroying reactions.

In some embodiments, the anode is chemically modified by sulfur-containing compounds and/or amine-containing compounds, as described herein, which are known to inhibit the above-described chemically destroying reaction.

In some embodiments, a fuel cell system as described herein is configured as a battery system. A battery system does not comprise chambers for supplying fuel and/or oxidant.

In some embodiments, the fuel cell system described herein is a liquid direct fuel cell, as such a fuel cell is defined in the art.

In some embodiments, the fuel cell system described herein operates at room temperature, although higher temperatures are also contemplated.

In some embodiments, a fuel cell system as described herein is operable upon contacting the anode with an amine-derived fuel as described herein, and with air.

In some embodiments, the fuel cell system comprises an anode compartment, a cathode and a separator interposed therebetween, as described herein, and is operable by a fuel that comprises ammonia borane, hydrazine, or a mixture thereof, as described herein.

In some embodiments, the anode, cathode and/or separator, and the anode electrolyte solution used in the fuel composition in the fuel cell system described herein are as described in WO 2010/055511 and WO 2010/055512, which are incorporated by reference as if fully set forth herein.

In some embodiments, the anode, cathode and/or separator, as well as the solution used in the fuel composition are as described hereinbelow.

The Anode:

In any of the fuel cell systems described herein, the anode comprises a catalyst layer that comprises copper, referred to herein also as a copper catalyst layer.

Herein, an anode that comprises a copper catalyst layer is also referred to interchangeably as a copper-containing anode, copper anode, copper-containing electrode, copper electrode, Cu anode or Cu electrode.

In some embodiments, the anode is made of copper. Such an anode represents an anode that comprises a copper catalyst layer as described herein, and can be referred to also as a copper-containing anode.

In some embodiments, the copper has a purity greater than 99%, greater that 99.9% and even greater than 99.99%.

In some embodiments, the copper catalyst layer (or the copper anode) comprises a copper alloy. The alloy can include, for example, a mixture of copper and additional one or more metals (e.g., gold and/or silver). In some embodiments, the weight percentage of copper in the alloy can range from 10% to 99.99% or from 10% to 99%, by weight. In some embodiments, the weight percentage of copper in the alloy can be 50%, 60%, 70%, 80%, 90%, 95%, 98%, 99%, 99.5%, 99.9%, 99.95% or 99.99%, by weight. Any intermediate value is also contemplated.

In some embodiments, the anode comprises a catalyst layer that consists of copper.

The copper catalyst layer can be in a form of, for example, a plate, a rod, a mesh, granules or particles. Other forms are also contemplated.

When being in a form of a mesh, in some embodiments, the mesh is characterized by a grid that ranges from 0.1 mm to 1 mm. The mesh can further be composed of wires that have a diameter in the range of 50-100 µm. The number and density of the wires in the grid can be manipulated, so as to obtain desired parameters (e.g., surface area).

The mesh, according to some embodiments of the invention, is characterized by high surface area (as compared, for example, to a plate or a rod), and can be regarded as having a morphology similar to microparticles.

In some embodiments, the copper mesh has a surface area higher than 1 cm$^2$.

In some embodiments, the catalyst layer containing copper or an alloy thereof is in a form of particles.

In some embodiments, the catalyst layer containing copper or an alloy thereof has a microstructure or a nanostructure.

By "microstructure" it is meant that the catalyst layer comprises microparticles or has morphological properties that resemble microparticles, as in the case of a mesh structure, as described herein.

"Microparticles", as used herein, describe particles of any shape, which have a size less than 1,000 microns (µm).

"Nanoparticles", as used herein, describe particles of any shape, which have a size less than 1,000 nm.

By "nanostructure" it is meant that the catalyst layer comprises nanoparticles or has morphological properties that resemble microparticles, obtained, for example, by forming a mesh nanostructure.

In some embodiments, the catalyst layer containing copper or an alloy thereof is in a form of nanoparticles. In some embodiments, the nanoparticles have a size that ranges from 10 nm to 500 nm. The nanoparticles can be round-shaped (e.g., spherical) nanoparticles, or can be in shaped as nanorods, having a size of 10-100 nm, as an example, or as nanowires, having a size of 10-100 nm, as an example. When spherical nanoparticles are used, the nanoparticles are typically deposited on a support, preferably a conductive support such as a carbon support, titanium support or Ni-foam support, or on a Cu electrode. In some embodiments, spherical nanoparticles have a diameter of, for example, 10-100 nm. The nanoparticles can also include a mixture of round-shaped, nanorods and/or nanowires.

The Cathode:

The air cathode can be any cathode suitable for use as air cathode. The air cathode can be either a commercial cathode or be designed and prepared as desired.

A cathode configured as air cathode is typically configured as capable of absorbing a gaseous material (e.g., oxygen or air), and includes a catalyst that is capable of participating in the electroreduction reaction that takes place in the vicinity of the cathode (or in the cathode compartment, if present).

An air cathode is typically made of a conductive layer, at least a part thereof being, or is coated by, a porous layer that allows diffusion of oxygen into the cathode. The catalyst is typically dispersed within the conductive layer. Currently available commercial air cathodes are commonly constituted of active carbon containing an oxygen-reduction catalyst in association with a finely divided hydrophobic polymeric material and incorporating a metal screen as the conductive element.

Representative examples of currently commercially available air cathodes include, but are not limited to, air cathodes manufactured by Electric Fuel (e.g., as E-4/E-4A and E-5), Evionyx, and E-TEK.

In some embodiments, the air cathode comprises a $MnO_2$ catalyst layer. An exemplary such cathode is described in the Examples section that follows.

Other metal oxides such as, for example, $Co_3O_4$, $La_2O_3$, $LaNiO_3$, $NiCo_2O_4$, $LaMnO_3$ and $LaNiO_3$, can also be included as catalysts in an air cathode.

In some embodiments, the air cathode comprises a catalyst layer that comprises a metal complex.

An exemplary such cathode, which comprises a cobalt porphyrin complex (e.g., cobalt phthalocyanine) is described in the Examples section that follows.

As used herein, the phrase "metal complex", also referred to herein and in the art as "a coordination compound", describes a metal having attached thereto, via coordinative bonds, one or more ligands. Typically, the metal in the metal complex is ionized, and further typically, the metal is ionized such that its oxidation state is higher than in its natural form (non-ionized). The number of coordinative bonds depends on the size, charge, and electron configuration of the metal ion and the ligands. The metal in the metal complex can be any metal in the periodic table, including alkali metals, alkali earth metals, transition metals, actinides, lanthanides, etc. In some embodiments, the metal is a transition metal.

The phrase "metal complex", as used herein, does not encompass metals that are not coordinatively bound to at least one ligand.

In some embodiments, the metal complex described herein is capable of acting as a charge-transfer mediator, e.g., an electron-transfer mediator, as described herein.

The phrase "electron-transfer mediator" in this context of the present embodiments therefore describes a metal complex, as described herein, in which the metal, a ligand or both can participate in a redox reaction.

Exemplary ligands that can participate in a redox reaction include ligands with two lone pair electrons, which can act as bridging ligands between two coordination centers, thus allowing electron transfer from one center to another.

Exemplary metals that can participate in redox reactions include metals that can adopt two or more oxidation states. Non-limiting examples include Iron ($Fe^{+2}/Fe^{+3}$), Chromium (Cr), Nickel (Ni) and Cobalt (Co).

In some embodiments, the metal complexes described herein can act as electron-transfer mediators by including a metal that can exist in two or more oxidation states, as described herein. Non-limiting examples include metal porphyrin complexes such as Co-phthalocyanine (CoPC) and Fe-phthalocyanine (FePC).

In some embodiments, the metal complex described herein is deposited on an organic conductive support, typically a carbon support as described hereinabove, thus forming a non-metallic electrode. Other organic, inorganic or metallic conductive supports, such as described herein, are also contemplated.

In some embodiments, the fuel cell comprises a cathode compartment which comprises the air cathode. As described hereinabove, in some embodiments, the fuel cell system further comprises means for introducing oxygen or air into the cathode compartment. In some embodiments, the cathode compartment can be at least partially opened so as to allow the air cathode to contact atmospheric air.

The Separator:

In any of the fuel cell systems described herein, a separator is interposed between the cathode and anode compartment.

In some embodiments, the separator is interposed between the anode compartment and the cathode compartment, if present.

The separator acts as a barrier between the cathode (or cathode compartment) and the anode compartment and is typically ion-permeable (ionically conductive) and electron-impermeable (electrically non-conductive). Thus, the separator is typically electron non-conducting and ion-conducting.

In some embodiments, the separator is a solid separator, and/or comprises a solid electrolyte membrane.

In some embodiments, the separator is an alkali anion exchange membrane, which allows the transfer of anions such as $OH^-$, but is impermeable to other anions and to cations such as protons.

In some embodiments, the separator is a hydroxide exchange membrane.

According to some embodiments of the invention, the separator is deposited onto the air cathode, acting as a protecting electrolyte membrane.

In some embodiments, the electrolyte membrane comprises one or more polymers and/or copolymers, optionally is a cross-linked form.

In some embodiments, an electrolyte membrane deposited on the air cathode is prepared by depositing a solution containing one or more polymers and/or copolymers, and optionally one or more cross-linking agents. This solution is referred to herein as a polymeric solution.

In some embodiments, the polymeric solution is deposited on a part of the surface of the air cathode that faces the anode, leaving other parts of the cathode's surface available for contacting the oxidant and/or the oxidant composition.

In some embodiments, the membrane is made of a polymer or co-polymer which comprises tertiary amine groups (that forms a cationic quaternary amine in an aqueous solution). Optionally, polymers and/or copolymers which comprise tertiary amine groups, sulfonate groups and/or aromatic groups are utilized for making the membrane.

In some embodiments, the polymeric solution, and hence the deposited electrolyte membrane, comprises one or more additives.

An exemplary additive is a tertiary amine or a cyclic tertiary amine. An optional additive is a polymer or a copolymer having tertiary amine groups or tertiary cyclic amine groups. An exemplary such polymer is poly(diallyl dimethyl ammonium chloride).

Tertiary amine groups are known as capable of conducting hydroxide ions.

In some embodiments, the polymeric solution comprises a cross-linking agent.

In cases where the polymeric solution comprises a cross-linking agent, a cross-linked form of the polymer or copolymer is obtained during the deposition and/or the drying procedure.

Representative examples of suitable cross-linking agents include, but are not limited to, polyethylene glycol (PEG), preferably a low MW PEG, having an average MW that ranges from 10 to 1000 Da; a glutaraldehyde (e.g., glutaricdialdehyde) or a polyglutaraldehyde (PGA), preferably having a low MW; diethyleneamine or other amino bifunctional compounds; acrylates (e.g., diacrylates, dimethacrylates, polyacrylates, bifunctional PEGs terminating with acrylate groups, etc.).

In some embodiments, an amount of each of the (optionally cross-linked) polymers and/or copolymers ranges from 1 to 10 weight percents of the total weight of the polymeric solution used for preparing the air cathode having the electrolyte membrane deposited thereon.

An exemplary protecting membrane, according to some embodiments of the present invention, is made of poly(vinyl alcohol-co-ethylene) (PVAcoPE).

In some embodiments, the poly(vinyl alcohol-co-ethylene) is in a cross-linked form.

In some embodiments, cross-linked poly(vinyl alcohol-co-ethylene) is obtained in the presence of a cross-linking agent.

In some embodiments, the cross-linking agent comprises polyethylene glycol (PEG). In some embodiments, the PEG is a low MW PEG, having an average MW that ranges from 10 to 1000 Da.

Optionally, the cross-linking agent is glutaricdialdehyde (GA). In some embodiments, glutaricdialdehyde and PEG are both used as cross-linking agents of poly(vinyl alcohol-co-ethylene).

In some embodiments, the weight ratio between the polymer (e.g., PVAcoPE) and the cross-linking agent (e.g., PEG or GA) ranges from about 3:1 to 1:3 (e.g., from 2:1 to 2:3).

In some embodiments, depositing the polymeric solution on the air cathode is performed while applying pressure and/or heat.

Subsequent to depositing the polymeric solution, the cathode is dried, so as to obtain an air cathode having a solid electrolyte membrane deposited thereon.

In some embodiments, a commercially available electrolyte membrane is utilized.

Depositing commercially available electrolyte membranes can be performed while applying pressure and/or heat.

A representative example of a commercially available electrolyte membrane suitable for use in these embodiments includes, but is not limited to, an electrolyte membrane obtained from "Tokuyama".

Any combination of an air cathode, as described herein, and a solid electrolyte membrane as described herein, can be utilized, according to the present embodiments, as an air cathode having a solid electrolyte membrane deposited thereon.

An air cathode having a solid electrolyte membrane deposited thereon can be prepared as desired, as described herein, or, alternatively, commercially available air cathodes having a solid electrolyte membrane deposited thereon can be utilized in the fuel system described herein.

The Fuel:

Any of the fuel cell systems described in these embodiments is operable by an amine-derived fuel.

The phrase "amine-derived fuel" is used herein to collectively describe ammonia borane, hydrazine, derivatives thereof, and any combination of thereof. The phrase "amine-derived fuel" encompasses compounds that are suitable for use a fuel (by having energy storage capacity), which contain an amine moiety.

In some embodiments, the amine-derived fuel comprises a compound having the formula: $R_1R_2R_3N$—$BR_4R_5R_6$, wherein each of $R_1$-$R_6$ is independently selected from the group consisting of hydrogen, alkyl, alkenyl, alkynyl, heteroalicyclic, alkoxy, and amine, as defined herein, provided that at least one of $R_4$, $R_5$ and $R_6$ is hydrogen.

It is noted that the fuel described herein produces electrons upon an electro-oxidation that is enabled by the presence of one or more hydride anions. Accordingly, the fuel cell efficiency depends, at least in part, on the number of electrons produced in the electro-oxidation process, which in turn, depends on the number of potential hydrides in the fuel. By "potential hydrides" it is meant to describe hydrogen atoms that have at least a partial negative charge and hence can function as electron donating groups.

Accordingly, in some embodiments, at least two of $R_4$, $R_5$ and $R_6$ are hydrogen.

In some embodiments, each of $R_4$, $R_5$ and $R_6$ is hydrogen.

Accordingly, in some embodiments the fuel is $R_1R_2R_3N$—$BH_3$, with $R_1$, $R_2$ and $R_3$ as defined herein.

In some embodiments, at least one of $R_1$, $R_2$ and $R_3$ is hydrogen.

In some embodiments, at least two of $R_1$, $R_2$ and $R_3$ are hydrogen.

In some embodiments, each of $R_1$, $R_2$ and $R_3$ is hydrogen.

In some embodiments, the fuel is $R_1R_2HN$—$BHR_4R_5$.

In some embodiments, the fuel is $R_1H_2NBH_2R_4$.

In some embodiments, the fuel is ammonia borane, $H_3NBH_3$, which is also presented herein and in the art as $NH_3BH_3$, and is also referred to herein and in the art as AB.

For the sake of simplicity, whenever ammonia borane is referred to herein throughout, it is to be understood that any of the herein-described derivatives, precursors, salts, hydrates and solvates of ammonia borane is also contemplated.

In some embodiments, the fuel cell system described herein comprises a precursor of ammonia borane, that is, a compound which can be readily converted to ammonia borane (e.g., by hydrolysis), and thus generates the fuel, in situ. In some embodiments, such a precursor is in a solid form. In some embodiments, the precursor generates ammonia borane by hydrolysis and/or thermal treatment (e.g., heating).

In some embodiments, the precursor is kept in a reactor which is operatively connected to the fuel cell system. The reactor serves for storing the precursor and/or for generating the fuel (the ammonia borane or a derivative thereof), which, once generated, is introduced (supplied) into the fuel cell (to the anode compartment).

In some embodiments, the amine-derived fuel comprises a compound having the formula: $R_7R_8N$—$NR_9R_{10}$, wherein each of $R_7$-$R_{10}$ is independently selected from the group consisting of hydrogen, alkyl, alkenyl, alkynyl, heteroalicyclic, alkoxy, carboxy, ketone, amide, hydrazide and amine, as defined herein, provided that at least one of $R_7$-$R_{10}$ is hydrogen, as discussed hereinabove.

In some embodiments, at least two of $R_7$-$R_{10}$ are hydrogen.

In some embodiments, each of $R_7$-$R_{10}$ is hydrogen.

Accordingly, in some embodiments the fuel is $H_2N$—$NH_2$ (hydrazine, or Hz).

In some embodiments, the fuel cell is a hydrazine derivative, in which one, two or three of $R_7$-$R_{10}$ is other then hydrogen. Non-limiting examples include hydrazine acetate ($NH_2$—$NH$—$COOH$), monomethyl hydrazine ($NH_2$—$NH(CH_3)$, symmetric and asymmetric dimethylhydrazine ($NH(CH_3)$—$NH(CH_3)$ and $NH_2N(CH_3)_2$, respectively), hydrazine carbonate (($N_2H_4)_2CO_2$), and aminopolyacrylamide (APA, —$[CH_2CH(CONHNH_2)]_{0.8}$—$[CH_2CH(CONH_2)]_{0.2}$).

In some embodiments, the fuel is a hydrazine salt. Non-limiting examples include hydrazine sulfate ($N_2H_4.H_2SO_4$), and hydrazine mono halogenid ($N_2H_4.HX$, wherein, X is halogen such as chloro, bromo or iodo).

In some embodiments, the fuel is a hydrate or solvate of the hydrazine, hydrazine derivative or hydrazine salt, as described herein.

The term "solvate" refers to a complex of variable stoichiometry (e.g., di-, tri-, tetra-, penta-, hexa-, and so on), which is formed by a solute (e.g., ammonia borane, hydrazine, a derivative thereof or a salt thereof) and a solvent, whereby the solvent does not interfere with the electrochemical activity of the solute.

The term "hydrate" refers to a solvate, as defined hereinabove, where the solvent is water.

For the sake of simplicity, whenever hydrazine is referred to herein throughout, it is to be understood that any of the herein-described derivatives, precursors, salts, hydrates and solvates, is also contemplated.

Accordingly, the fuel cell systems described herein are also referred to as hydrazine-based fuel cells, and encompass hydrazine and/or its derivatives, salts, hydrates and solvates, as described herein, as fuel.

In some embodiments, the fuel cell system described herein comprises a precursor of hydrazine, that is, a compound which can be readily converted to hydrazine (e.g., by hydrolysis), and thus generate hydrazine, in situ. Such a precursor overcomes the limitations associated with hydrazine-based fuel cells, since when the fuel cell is not operated, the hydrazine is kept in a more stable and less toxic form, and thus, for example, storage and transportation are facilitated. In some embodiments, such a precursor is in solid form. In some embodiments, the precursor generates hydrazine by hydrolysis and/or thermal treatment (e.g., heating). An exemplary precursor is hydrazone.

In some embodiments, the precursor is kept in a reactor which is operatively connected to the fuel cell system. The reactor serves for storing the precursor and/or for generating the hydrazine, which, once generated, is introduced into the fuel cell.

In some embodiments, the amine-derived fuel comprises a mixture of the amine-derived compounds described herein.

In some embodiments, the fuel comprises a mixture of ammonia borane, a derivative or a salt thereof and hydrazine, a derivative or a salt thereof, as described herein.

In some embodiments, a mole ratio of the ammonia borane, a derivative or a salt thereof and hydrazine, a derivative or a salt thereof, as described herein, in the mixture, ranges from 200:1 to 1:200, as is further detailed hereinbelow within the description of a mixed fuel.

The term "alkyl" describes a saturated aliphatic hydrocarbon including straight chain and branched chain groups. In some embodiments, the alkyl group has 1 to 20 carbon atoms. Whenever a numerical range; e.g., "1-20", is stated herein, it implies that the group, in this case the alkyl group, may contain 1 carbon atom, 2 carbon atoms, 3 carbon atoms, etc., up to and including 20 carbon atoms. In some embodiments, the alkyl is a medium size alkyl having 1 to 10 carbon atoms. In some embodiments, the alkyl is a lower alkyl having 1 to 4 carbon atoms.

The term "alkenyl" describes an alkyl, as defined herein, which has at least 2 carbon atoms and at least one unsaturated double bond.

The term "alkynyl" describes an alkyl, as defined herein, which has at least 2 carbon atoms and at least one unsaturated triple bond.

The term "cycloalkyl" describes an all-carbon monocyclic or fused ring (i.e., rings which share an adjacent pair of carbon atoms) group where one or more of the rings does not have a completely conjugated pi-electron system.

The term "haloalkyl" describes an alkyl group as defined above, further substituted by one or more halide.

The term "alkoxy" describes both an —O-alkyl and an —O-cycloalkyl group, as defined herein.

The term "heteroalicyclic" describes a monocyclic or fused ring group having in the ring(s) one or more atoms such as nitrogen, oxygen and sulfur. The rings may also have one or more double bonds. However, the rings do not have a completely conjugated pi-electron system. Representative examples are piperidine, piperazine, tetrahydrofurane, tetrahydropyrane, morpholino and the like.

The term "carboxy" describes a —C(=O)—OR' group, wherein R' is as described herein, or, alternatively, can be a hydrazine group or a derivative thereof, as described herein. When R' is hydrazine, a carboxy derivative of hydrazine is referred to herein as hydrazine carbonate.

The term "ketone" describes a —C(=O)—R' group, wherein R' is as described herein, or alternatively, R' is a polymeric backbone of which the —C(=O)-hydrazine is a pendant group.

The term "amide" describes a —C(=O)—NR'R", wherein R' and R" are as described herein.

The term "hydrazide" describes a —C(=O)—$NR_1NR_3R_4$, wherein $R_1$, $R_3$ and $R_4$ are as described herein.

As used herein, the term "amine" describes a —NR'R" group or a +NR'R"R'" group, wherein R', R" and R'" correspond to $R_1$-$R_3$ or $R_7$-$R_{10}$, as described herein.

As used herein, the term "sulfonate" describes a —S(=O)$_2$—R' group, where R' is as defined herein.

Operation and Uses of the Fuel Cell System:

In some embodiments, the fuel cell systems described herein are operable by contacting the anode with the amine-derived fuel as described herein, while contacting the cathode with oxygen (e.g., with air).

In some embodiments, contacting the anode with the fuel comprises contacting the anode with a fuel composition that comprises the amine-derived fuel and an aqueous solution that serves as an anode electrolyte solution.

In some embodiments, contacting the anode with the fuel comprises at least partially filling the anode compartment with a fuel composition that comprises the amine-derived fuel and an aqueous solution that serves as an anode electrolyte solution, as described herein.

In some embodiments, the aqueous solution is an alkaline aqueous solution.

In some embodiments, the alkaline aqueous solution comprises a metal alkali hydroxide.

As shown in FIGS. 2A and 2B, hydroxide ions participate in the electrochemical reactions involved while operating the fuel cell systems described herein.

The metal alkali hydroxide can be, for example, sodium hydroxide, potassium hydroxide, lithium hydroxide, magnesium hydroxide, calcium hydroxide, strontium hydroxide and/or barium hydroxide.

In some embodiments, the metal alkali hydroxide is potassium hydroxide.

In some embodiments, a concentration of the metal alkali hydroxide in the aqueous solution ranges from 0.1 M to 6M, with a concentration of 6M being preferred.

In some embodiments, the fuel cell composition comprises, in addition to, or instead of, the alkali metal hydroxide, an alkali metal sulfate salt such as, for example, sodium sulfate, potassium sulfate, magnesium sulfate, calcium sulfate and barium sulfate.

In some embodiments, a concentration of the fuel in the aqueous solution described herein (anode electrolyte solution; fuel composition) ranges from 0.01 M to a saturated solution.

The concentration of the fuel is also determined by the desire to control the balance between the electrochemical reaction and the undesired chemically destroying reaction. At high fuel concentration, the extent of the chemically destroying reaction can be increased.

In some embodiments, the concentration of the fuel in the fuel composition ranges from 0.01 M to 10 M, from 0.1 M to 10 M, or from 1 M to 10 M.

In some embodiments, the fuel is ammonia borane, as defined herein, and the concentration of the fuel in the fuel composition ranges from 0.01 M to 3 M, from 0.1 M to 3 M, or from 1 M to 3 M.

In some embodiments, the fuel is hydrazine, as defined herein, and the concentration of the fuel in the fuel composition ranges from 0.01 M to 10 M, from 1 M to 10 M, or from 5 M to 10 M.

The fuel composition in the anode compartment can further comprise surface active agents, in order to prevent or decrease evolution of hydrogen gas and/or gaseous ammonia. The concentration of these agents in the composition can range from 0.001% to 1%, or from 0.001% to 0.1%, or from 0.001% to 0.01% by weight. Exemplary suitable surface active agents include, but are not limited to, tetraalkylammonium compounds and/or aliphatic amines.

In some embodiments, the electrolyte anode solution in the fuel composition can further comprise an organic solvent. The addition of an organic solvent may be beneficial for preventing or reducing evolution of hydrogen and/or gaseous ammonia.

In some embodiments, the content of the organic solvent can be in the range of 1% to 30% by weight, of the total weight of the composition.

Exemplary organic solvents that are suitable for use in this context of the present embodiments include, but are not limited to, dimethylformamide (DMF), ethylene glycol (EG), dimethyl sulfoxide (DMSO) and acetonitrile (AN).

Some embodiments of the alkaline solution are described in WO 2010/055511 and WO 2010/055512.

As discussed hereinabove, any of the fuel cell systems described herein utilizes the described fuel so as to generate electrical power (energy).

Accordingly, according to another aspect of embodiments of the invention there is provided a method of generating electricity, which is effected by electrochemically reacting a fuel, as described herein, and oxygen (e.g., in air), as described herein. In some embodiments, the electrochemical reaction is performed in a fuel cell system as described herein.

In some embodiments, the method is effected by supplying a fuel composition, as described herein, to the anode compartment of the fuel cell system, as described herein, and by supplying air or oxygen, as described herein, to the cathode compartment of the fuel cell system, as described herein, and by continuing supplying these components as long as electricity is required, and/or as desired, such that the system operates as a fuel cell.

Supplying the fuel and air or oxygen to the respective compartments of the fuel cells can be effected by any means known in the art (e.g., via a pump, a pipe, etc.).

In some embodiments, the method is effected by supplying a fuel composition, as described herein, to the anode compartment of the fuel cell system, as described herein, and by contacting the cathode with oxygen (e.g., oxygen found in air), as described herein, and by continuing supplying the fuel to the anode compartment and allowing contacting the cathode with oxygen as long as electricity is required, and/or as desired, such that the system operates as a fuel cell.

In some embodiments, the method is effected by utilizing the system as a battery, such that the fuel is supplied only before use.

According to another aspect of embodiments of the invention there is provided a method of operating a fuel cell, which is effected by contacting an anode compartment of the fuel cell with an anode electrolyte solution that comprises the fuel, and, at the same time, contacting a cathode of the fuel cell with air or oxygen, as described herein, and electrochemically reacting the fuel and oxygen. In some embodiments, the fuel cell system is any of the fuel cell systems as described herein.

II. A Fuel Cell System Operable by a Mixed Fuel:

As demonstrated in the Examples section that follows, the present inventors have surprisingly uncovered that a mixture of hydrazine and ammonia borane can be utilized as a fuel in a fuel system that comprises a copper catalyst-containing anode, and that such a fuel system, when operated by contacting such a mixed fuel, exhibits high efficiency.

While hydrazine or derivatives or salts thereof are typically readily available, low-cost materials, as discussed hereinabove, the performance of these materials when used as fuel was shown to be inferior to that of ammonia borane. Therefore, the findings that by mixing a hydrazine-based fuel with even a small amount of ammonia borane, substantially improved performance of fuel cell systems is obtained, provide for an advantageous operation of fuel cell systems (such as the low-cost systems equipped with a copper-containing anode and an air cathode).

According to an aspect of some embodiments of the present invention there is provided a fuel cell system comprising an anode compartment which comprises an anode having a copper catalyst layer, a cathode and a separator interposed between the anode and the cathode, the fuel cell being operable by a fuel which comprises a mixture of:

a compound having the formula: $R_1R_2R_3N-BR_4R_5R_6$, as defined hereinabove, wherein each of $R_1$-$R_6$ is independently selected from the group consisting of hydrogen, alkyl, alkenyl, alkynyl, heteroalicyclic, alkoxy, and amine, provided that at least one of $R_4$, $R_5$ and $R_6$ is hydrogen; and a compound having a formula: $R_7R_8N-NR_9R_{10}$, as defined hereinabove, wherein each of $R_7$-$R_{10}$ is independently selected from the group consisting of hydrogen, alkyl, alkenyl, alkynyl, hydrazide and amine, provided that at least one of $R_7$-$R_{10}$ is hydrogen.

Such a fuel is referred to herein as a mixed fuel since it comprises one or more compounds of the ammonia borane type fuels and one or more compounds of the hydrazine type fuels.

In some embodiments, each of $R_1$-$R_6$ is hydrogen, such that one fuel component in the mixture is ammonia borane.

In some embodiments, any of the ammonia borane derivatives, salts, precursors, hydrates or solvates described herein can be used as one component ion the mixed fuel.

In some embodiments, each of $R_7$-$R_{10}$ is hydrogen, such that the other fuel component in the mixture is hydrazine.

In some embodiments, any of the hydrazine derivatives, salts, precursors, hydrates or solvates described herein can be used as the other component ion the mixed fuel.

In some embodiments, a mole ratio between the compound having a formula: $R_1R_2R_3N-BR_4R_5R_6$ (an ammonia borane type fuel component) and the compound having a formula: $R_7R_8N-NR_9R_{10}$ (an hydrazine type fuel component) ranges from 200:1 to 1:200. In some embodiments, the mole ratio ranges from 100:1 to 1:100 or from 50:1 to 1:50, or from 20:1 to 1:20, or from 10:1 to 1:10, or from 1:1 to 1:10, or from 1:1 to 1:20, or from 1:1 1:50 or from 1:1 to 1:100. Any mole ratio between the indicated values is contemplated.

In some embodiments, the mole ratio ranges from 1:1 to 1:10. Exemplary mole ratios include, but are not limited to, 1:1, 2:3 and 1:8.

In terms of weight ratio, a ratio between the compound having a formula: $R_1R_2R_3N-BR_4R_5R_6$ (an ammonia borane type fuel component) and the compound having a formula: $R_7R_8N-NR_9R_{10}$ (an hydrazine type fuel component) ranges from 0.1:99.9 to 99.9:0.1. Any weight ratio between the indicated values is contemplated.

In some embodiments, the weight ratio ranges from 99.5:0.5 to 0.5 to 99.5, or from 99:1 to 1:99, or from 95:5 to 5:95, or from 90:10 to 10:90, or from 80:20 to 20:80, or from 70:30 to 30:70 or is 50:50 weight percents.

In some embodiments, the weight ratio ranges from 50:50 to 0.1:99.9, or from 50:50 to 1:99, or from 50:50 to 5:95, or from 50:50 to 10:90 weight percents.

Weight ratios are given as the weight percents of each fuel component in the mixed fuel.

In some embodiments, the fuel cell system is operable by contacting the anode with the mixed fuel and contacting the cathode with an oxidant.

In some embodiments, contacting the anode with the mixed fuel is effected by contacting the anode with a fuel composition, as described herein.

In some embodiments, the fuel composition comprises the mixed fuel as described herein and an aqueous anode solution (e.g., an alkaline aqueous solution), as described hereinabove.

In some embodiments, the anode compartment comprises a copper-containing anode as described hereinabove.

Any of the features described hereinabove for the anode compartment of a fuel cell system operable by an amine-derived fuel and oxygen or air are contemplated in these embodiments.

In some embodiments, the fuel cell system comprises a cathode configured as an air cathode, as described herein. The fuel cell system according to these embodiments is operable by contacting the cathode with oxygen or air, as described herein.

Any of the features described hereinabove for the fuel cell system operable by an amine-derived fuel and oxygen or air are contemplated in these embodiments.

In some embodiments, the fuel cell system comprises a cathode compartment, which comprises an air cathode and means for introducing oxygen into the cathode compartment, or which is at least partially opened to allow the air cathode to contact atmospheric air, as described hereinabove.

Alternatively, the cathode is a cathode other than an air cathode.

In some embodiments, the fuel cell system comprises a cathode compartment, which comprises the cathode, and when the fuel cell is operated, oxidant composition is at least partially filling the cathode compartment, as described herein.

In some embodiments, the cathode in the fuel cell system can comprise any catalyst layer that is suitable for use in an amine-derived-based fuel cell, with the respective oxidant, so as to catalyze the electro-reduction of the oxidant.

Exemplary catalyst layers that are suitable for use in the context of these embodiments of the invention include, but are not limited to, a catalyst layer that comprises copper, silver, gold or an alloy of at least one or two of gold, silver and copper; a catalyst layer that comprises platinum or platinum group metals (PGM); a catalyst layer that comprises cobalt, nickel, iron, or other suitable metals; a catalyst layer that comprises oxides of suitable transition metals; a catalyst layer that comprises metal complexes of suitable transition metals; and a catalyst layer that comprises a non-metallic substance, as is further detailed hereinbelow.

In some embodiments, the cathode comprises a catalyst layer which is, or which comprises, a non-metallic substance.

As used herein, the phrase "a non-metallic substance" encompasses any compound that does not include an unbound metal, namely, a metal in its zero oxidation state, which is not coordinatively bound to a ligand. The phrase "non-metallic substance" therefore encompasses, for example, organic substances, inorganic substances and metallic complexes.

In some embodiments, the non-metallic substance can act as an electron-transfer mediator.

The phrase "electron-transfer mediator", which is also referred to herein interchangeably as "electron-transfer mediating substance" or "electron-transfer mediating agent" describes a substance that can participate in a redox reaction, via, for example, a reversible change in its electronic configuration. Thus, an electron-transfer mediator is typically a compound that can form a redox couple, or, in other words, a mixed valence compound.

Exemplary organic substances that can act as electron-transfer mediators and which are suitable for use in this context of these embodiments of the invention include, but are not limited to, quinone or its derivatives, organic conducting salts, or viologen.

Representative examples include, but are not limited to, 7,7,8,8-tetracyanoquinodimethane, tetrathiafulvalene, N-methylacridinium, tetrathiatetracene, N-methylphenazinium, hydroquinone, 3-dimethylaminobenzoic acid, 3-methyl-2-benzothiazolinone hydrazone, 2-methoxy-4-allylphenol, 4-aminoantipyrin, dimethylaniline, 4-aminoantipyrene, 4-methoxynaphthol, 3,3',5,5'-tetramethylbenzidine, 2,2-azino-di-[3-ethylbenzthiazoline sulfonate], o-dianisidine, o-toluidine, 2,4-dichloro phenol, 4-aminophenazone, and benzidine.

As used herein, the phrase "metal complex", also referred to herein and in the art as "a coordination compound", describes a metal having attached thereto, via coordinative bonds, one or more ligands, as defined hereinabove.

The phrase "metal complex", as used herein, encompasses inorganic complexes, in which the ligands in the complex are inorganic (e.g., —OH, —NO, —CO, —CN, etc.) and organic complexes (also referred to herein and in the art as organometallic complexes), in which at least one of the ligands in the complex is organic (e.g., cyclopentadienyl, ethylene, etc.).

The phrase "metal complex", as used herein, does not encompass metals that are not coordinatively bound to at least one ligand.

In some embodiments, the metal complex described herein is capable of acting as a charge-transfer mediator, e.g., an electron-transfer mediator, as defined hereinabove.

In some embodiments, the metal complexes described herein can act as electron-transfer mediators by including a metal that can exist in two or more oxidation states, as described herein. Non-limiting examples include iron complexes such as Prussian blue, ferrocene, potassium ferricyanide, potassium ferrocyanide, dimethylferrocene, ferricinium, ferocene-monocarboxylic acid, nickel complexes such as nickelocene. Other complexes of transition metals are also contemplated.

In some embodiments, the metal complexes described herein are iron complexes.

In some embodiments, the non-metallic substance described herein is deposited on an organic conductive support, typically a carbon support as described herein, thus forming a non-metallic electrode. Other organic, inorganic or metallic conductive supports are also contemplated.

In some embodiments, the amount of the non-metallic catalyst layer in a non-metallic (e.g., carbon-based) electrode ranges from 0.01% to 1.5% by weight, of the total weight of the electrode.

In some of these embodiments, the fuel cell system is operable by contacting the cathode with an oxidant composition, as described hereinabove.

In some embodiments, the oxidant is a peroxide (e.g., hydrogen peroxide).

In some embodiments, when the fuel cell is operated, the cathode compartment comprises an acidic aqueous solution, which, together with the peroxide oxidant, forms an oxidant composition.

The aqueous solution comprises an acid, preferably an inorganic acid, at a concentration that ranges from 0.5 M to 5M. In some embodiments, the oxidant composition comprises HCl, $H_2SO_4$ or a mixture thereof.

In some embodiments, when the oxidant is a peroxide, a concentration of the peroxide oxidant in the aqueous solution ranges from 0.5% w/v to 25% w/v, or from 0.5% w/v to 20% w/v, or from 0.5% w/v to 10% w/v, or from 0.5% w/v to 5% w/v.

In some embodiments, the oxidant composition further comprises surface active agents that may prevent evolution of oxygen gas (bubbles). A concentration of such agents can be in the ranges of from 0.001% to 1%, or from 0.01% to 1%, by weight.

In some embodiments, the electrolyte aqueous solution in the anode and/or cathode compartments (the fuel cell composition and/or the oxidant composition, respectively) can further comprise an organic solvent. The addition of an organic solvent may be beneficial for preventing or reducing evolution of hydrogen and/or nitrogen (in anode) and/or oxygen (in cathode) as bubbles.

In some embodiments, the content of the organic solvent can be in the range of 1% to 30% by weight, of the total weight of the composition.

Exemplary organic solvents that are suitable for use in this context of the present embodiments include, but are not limited to, dimethylformamide (DMF), ethylene glycol (EG), dimethyl sulfoxide (DMSO) and acetonitrile (AN).

The fuel cell systems according to these embodiments of the invention further comprise a separator interposed between the cathode (or cathode compartment) and the anode compartment.

The separator acts as a barrier between the cathode (or cathode compartment) and the anode compartment and is typically ion-permeable (ionically conductive) and electron-impermeable (electrically non-conductive). Thus, the separator is typically electron non-conducting and ion-conducting.

The separator can be, and is also referred to herein, as an electrolyte membrane.

In some embodiments, the separator is a solid separator, or comprises a solid electrolyte membrane.

In some embodiments, the separator is an alkali anion exchange membrane, which allows the transfer of anions such as OH$^-$, but is impermeable to other anions and to cations such as protons.

Any available alkali anion exchange membrane can be used in the context of these embodiments of the invention, including, as non-limiting examples, carbon-based membranes and nickel-based membranes.

In some embodiments, the solid electrolyte membrane is a Nafion membrane, preferably a Nafion Bilayer membrane such as, for example, Nafion 112, Nafion 115, Nafion 117 and Nafion 119, and any membrane in Nafion series 900-2000.

In some embodiments, the solid electrolyte membrane is a polypropylene membrane (e.g., a polypropylene micropore membrane having a pore diameter smaller than 0.1 μm).

In some embodiments, the solid electrolyte membrane is a polypropylene membrane wetted with a Nafion solution (e.g, from 0.05% to 0.5% by weight Nafion in ethanol).

In some embodiments, the separator is a solid electrolyte membrane which is deposited on the cathode, as described hereinabove.

The fuel cell system described in these embodiments corresponds to the fuel cell system illustrated in FIG. 1, in which cathode 18 can be an air cathode, as described hereinabove, or another cathode as described herein (which is not an air cathode), and in which cathode compartment 14 comprises an oxidant composition as described herein, when the fuel cell is operated.

In some embodiments, the fuel cell systems described herein are operable by contacting the anode with the amine-derived fuel as described herein, while contacting the cathode with oxygen (e.g., with air).

In some embodiments, contacting the anode with the fuel comprises contacting the anode with a fuel composition that comprises the amine-derived fuel and an aqueous solution that serves as an anode electrolyte solution.

In some embodiments, the aqueous solution is an alkaline aqueous solution.

In some embodiments, the alkaline aqueous solution comprises a metal alkali hydroxide.

As shown in FIGS. 2A and 2B, hydroxide ions participate in the electrochemical reactions involved while operating the fuel cell systems described herein.

The metal alkali hydroxide can be, for example, sodium hydroxide, potassium hydroxide, lithium hydroxide, magnesium hydroxide, calcium hydroxide, strontium hydroxide and/or barium hydroxide.

In some embodiments, the metal alkali hydroxide is potassium hydroxide.

In some embodiments, a concentration of the metal alkali hydroxide in the aqueous solution ranges from 0.1 M to 6M, with a concentration of 6M being preferred.

In some embodiments, the fuel cell composition comprises, in addition to, or instead of, the alkali metal hydroxide, an alkali metal sulfate salt such as, for example, sodium sulfate, potassium sulfate, magnesium sulfate, calcium sulfate and barium sulfate.

In some embodiments, a concentration of the fuel in the aqueous solution described herein (anode electrolyte solution; fuel composition) ranges from 0.01 M to a saturated solution.

The concentration of the fuel is also determined by the desire to control the balance between the electrochemical reaction and the undesired chemically destroying reaction. At high fuel concentration, the extent of the chemically destroying reaction can be increased.

In some embodiments, the concentration of the fuel in the fuel composition ranges from 0.01 M to 10 M, from 0.1 M to 10 M, or from 1 M to 10 M.

In some embodiments, the fuel is ammonia borane, as defined herein, and the concentration of the fuel in the fuel composition ranges from 0.01 M to 3 M, from 0.1 M to 3 M, or from 1 M to 3 M.

In some embodiments, the fuel is hydrazine, as defined herein, and the concentration of the fuel in the fuel composition ranges from 0.01 M to 10 M, from 1 M to 10 M, or from 5 M to 10 M.

The fuel composition in the anode compartment can further comprise surface active agents, in order to prevent or decrease evolution of hydrogen gas and/or gaseous ammonia. The concentration of these agents in the composition can range from 0.001% to 1%, or from 0.001% to 0.1%, or from 0.001% to 0.01% by weight. Exemplary suitable surface active agents include, but are not limited to, tetraalkylammonium compounds and/or aliphatic amines.

In some embodiments, the electrolyte anode solution in the fuel composition can further comprise an organic solvent. The addition of an organic solvent may be beneficial for preventing or reducing evolution of hydrogen and/or gaseous ammonia.

In some embodiments, the content of the organic solvent can be in the range of 1% to 30% by weight, of the total weight of the composition.

Exemplary organic solvents that are suitable for use in this context of the present embodiments include, but are not limited to, dimethylformamide (DMF), ethylene glycol (EG), dimethyl sulfoxide (DMSO) and acetonitrile (AN).

Some embodiments of the alkaline solution are described in WO 2010/055511 and WO 2010/055512.

As discussed hereinabove, any of the fuel cell systems described herein utilizes the described fuel so as to generate electrical power (energy).

Accordingly, according to another aspect of embodiments of the invention there is provided a method of generating electricity, which is effected by electrochemically reacting a mixed fuel, as described herein, and an oxidant, as described herein (e.g., oxygen, a peroxide, etc.). In some embodiments, the electrochemical reaction is performed in a fuel cell system as described herein.

In some embodiments, the method is effected by supplying a mixed fuel composition, as described herein, to the anode compartment of the fuel cell system, as described herein, and by supplying air or oxygen, or an oxidant composition as described herein, to the cathode compartment of the fuel cell system, as described herein, and by continuing supplying these components as long as electricity is required, and/or as desired, such that the system operates as a fuel cell.

Supplying the mixed fuel composition and air or oxygen or an oxidant composition to the respective compartments of the fuel cells can be effected by any means known in the art (e.g., via a pump, a pipe, etc.).

In some embodiments, the method is effected by utilizing the system as a battery, such that the fuel is supplied only before use.

According to another aspect of embodiments of the invention there is provided a method of operating a fuel cell as described in these embodiments, which is effected by contacting an anode compartment of the fuel cell with an anode electrolyte solution that comprises the mixed fuel as described herein, and, at the same time, contacting a cathode compartment of the fuel cell with air or oxygen or an oxidant composition, as described herein, and electrochemically reacting the mixed fuel and the oxidant. In some embodiments, the fuel cell system is any of the fuel cell systems as described herein.

III. Applications:

Any of the fuel cell systems described herein can be used in many applications. Generally, the fuel cell system can be incorporated in any electrically driven or hybrid electric (namely, driven by electrical and at least one additional form of energy) system or device, or can be in electrical communication with the system or device for operating it. Systems and devices incorporating the fuel cell as described herein can be stationary or movable, portable or non-portable. In some embodiments, the fuel cell system is incorporated in a power source which is adapted to power the electrically driven system or device. The size, shape and output of the fuel cell is preferably adapted to the application which consumes its energy.

Herein, the phrase "electrically driven system or device" and "electricity consuming system or device" are used interchangeably.

One type of application which can incorporate the fuel cell or portable power source according to some embodiments of the present invention is an electronic device. Representative examples of such device, include, without limitation, a portable telephone, a personal computer, a notebook computer, a portable charging dock, a pager, a PDA, a digital camera, a gameplayer, a smoke detector, a hearing aid, a portable TV, night vision goggles, a portable GPS device, a portable lighting device, a toy, a computer peripheral device, an household appliance, a cordless household appliance, an industrial product, a mobile equipment, a robot, a cordless tool (e.g., drill, saw).

Another type of application which can incorporate the fuel cell or portable power source according to some embodiments of the present invention is an electrically driven or hybrid electric vehicle. One example of a vehicle suitable for the present embodiments is an automobile such as, but not limited to, a car, a bus, a forklift, a segway, a motorcycle, a mobility scooter, a two- three- or four-wheel scooter, a saddle-ride type vehicle. Another example is an unmanned utility vehicle, such as, but not limited to, an autonomous lawn mower, an autonomous pool cleaner and the like. An additional example is an elevated altitude manned or unmanned vehicle, such as, but not limited to, an aircraft, a high altitude aircraft, a rocket and a spacecraft. A further example is a manned or unmanned underwater or above-water vehicle.

The fuel cell described herein can also be incorporated in distributed power source such as, but not limited to, a cogeneration system or a stationary power plant for a house, a public structure an industrial facility. Also contemplated are various appliances typical used in emergency situations, including, without limitation, emergency kits, emergency power supplies, emergency lights, backup generators and the like.

The fuel cell systems presented herein can be further used as a component in a power source in a location, such as, but not limited to, spacecraft, weather station, park, rural location and the like. A fuel cell system according to some embodiments of the present invention can be compact and lightweight.

The fuel cell systems presented herein can be further used in combined heat and power systems. The fuel cell systems of the present embodiments can be used to generate electric power, and at the same time produce hot air and water from the waste heat.

In some embodiments, the fuel cell systems described herein are utilized in a method for powering an electrically-driven or electricity-consuming system or device, as described herein. The powering is effected by establishing electrical communication (e.g., connecting) between the fuel cell system and the electricity-consuming system or device.

The fuel cell of the present embodiments can also operate in combination with one or more additional electrical energy storage devices, preferably, but not necessarily, portable storage devices.

The electrical energy storage device can be embodied as a rechargeable battery device whereby charge storage is achieved via electron transfer that produces a redox reaction. The electrical energy storage device can alternatively or additionally be embodied as an electric double-layer capacitor, also known as a supercapacitor, whereby the storage of electrical energy is electrostatic, substantially devoid of any electron transfer.

The electrical energy storage device can be used for powering an electricity-consuming system or device, and the fuel cell is used for charging the electrical energy storage device, thus extending the lifetime of the electrical energy storage device. The charging can be done intermittently or continuously with the operation of the electricity-consuming system.

The electrical energy storage device is optionally and preferably configured for providing variable power to the electricity-consuming system, wherein the variability provided by the electrical energy storage device is preferably larger than the maximal output power variability characterizing the fuel cell.

As used herein, "output power variability," refers to the maximal change in power at a generally constant voltage level (e.g., within 5% or less) over a predetermined time period. This quantity is linearly correlated to output current variability, which is defined as the maximal change in current at a generally constant voltage level over a predetermined time period.

The combination of the fuel cell and electrical energy storage device therefore provides both enhanced output power variability and enhanced lifetime.

Thus, some embodiments of the present invention provide a system which comprises an electricity-consuming system, an electrical energy storage device arranged for powering the electricity-consuming system and a fuel cell arranged for charging the electrical energy storage device.

In some embodiments, the electricity-consuming system or device comprises a fuel cell system as described herein, and powering is further effected by operating the fuel cell system, as described herein.

It is expected that during the life of a patent maturing from this application many relevant air cathodes will be developed and the scope of the term "air cathode" or "a cathode configured as an air cathode" is intended to include all such new technologies a priori.

It is expected that during the life of a patent maturing from this application many relevant solid electrolyte membranes will be developed and the scope of the term "separator" or "hydroxide exchange membrane" is intended to include all such new technologies a priori.

It is expected that during the life of a patent maturing from this application many relevant air cathodes having an anion exchange membrane deposited thereon will be developed and the scope of the term "air cathode" or "a cathode configured as an air cathode" and the terms "separator or "exchange membrane" is intended to include all such new technologies a priori.

As used herein, the phrases "fuel cell", "fuel cell device" and "fuel cell system" are used interchangeably.

As used herein and in the art, the phrase "open circuit potential", denoted as $E_{OCP}$, describes the potential measured between an anode and a cathode when there is no external load, namely, no current is applied to or formed in the cell.

As used herein and in the art, the phrase "working potential", denoted as $E_W$, is the potential measured in an electrochemical cell (between anode and cathode) when current is applied to or formed in the cell.

As used herein and in the art, the term "overpotential", denoted as $E_{OP}$, is the potential at which a redox reaction occurs in the presence of one catalyst as compared to another catalyst. In other words, an overpotential reflects the effect of replacing a catalyst on the potential required for an electrochemical process to occur.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Material and Experimental Methods

Materials:

Polyethylene glycol (average MW 200 Da) and poly(vinyl alcohol-co-ethylene, ethylene content 27% mole) were purchased from Sigma-Aldrich.

All other chemical reagents were also purchased from Sigma-Aldrich in analytical grade, unless otherwise indicated.

Ultrapure water (electrical resistance of 18 MΩ) from EasyPure RF (Barnstead) source was used throughout all the experiments.

Cu-mesh electrode 99.5% (wire thickness; 150 μm, 12.5 mm wide and 1.5 mm thick) was purchased from Teknolabor. In half-cell experiments, the same electrode as folded 4 times, producing a surface area A of 1.25 $cm^2$.

A commercial air cathode ($MnO_2$ catalyst, 60 $cm^2$) was purchased from Electric Fuel.

Another commercial air cathode (a cobalt porphyrin catalyst, 70 $cm^2$) was purchased from Evionyx.

A commercial hydroxide exchange membrane was purchased from Fumatech (Fumatech, membrane 20 μm).

Electrochemical Measurements:

Electrochemical measurements were performed in a standard three electrode cell consisting of the working electrode (anodic or catholic part), carbon electrode (d=5 mm) as counter electrode and Ag|AgCl (sat. KCl) as reference electrode (Metrohm).

Full cell experiments were performed in a homemade polyvinyl chloride (PVC) cell.

The electrochemical experiments were conducted using PC-controller (Autolab GPES software, version 4.9) and Autolab potentiostat/galvanostat (PGSTAT302N).

Discharge Efficiency:

Experiments were preformed in different galvanostatic regimes and the efficiency of the discharge process was calculated according to the following equation:

$$\eta = Q_d \cdot Q_t^{-1} \cdot 100\%$$

wherein η is the efficiency (reported in %), $Q_t$ is the theoretical calculated charge (Coulomb, corresponding to the amount of hydrazine) and $Q_d$ is the real charge derived from the discharge curves, when a sharp decrease of voltage was observed.

Example 1

AB/Air Fuel Cell

An exemplary AB/air fuel cell system according to some embodiments of the invention, as illustrated in FIG. 2A, was assembled using a Cu-mesh electrode (Teknolabor, 60 $cm^2$) as an anode and a commercial air cathode ($MnO_2$ catalyst, 60 $cm^2$, Electric fuel), coated by a hydroxide-exchange membrane, as follows.

The coated air cathode was prepared by depositing on the commercial air cathode 2.5 ml of a solution containing 5% w/v poly(vinyl alcohol-co-ethylene) and 5% w/v polyethylene glycol (average MW 200 Da) in a 1:1 n-propane and water mixture and subsequent drying at 120° C. for 1 hour.

FIGS. 3A-C present the results obtained for this exemplary $AB/O_2$ fuel cell, being 6×10×2.5 cm in size, 60 $cm^2$ geometrical area, and containing a coated commercial air cathode as described hereinabove and a Cu mesh anode as described hereinabove in an anode solution containing 50 ml of 2 M (3 grams) ammonia borane (AB) in 6 M KOH+4.2 grams solid KOH.

FIG. 3A is a graph presenting E vs. I (derived from a galvanostatic-step experiment, by setting each current value for 20 seconds).

FIG. 3B is a graph showing the calculated power vs. current.

FIG. 3C is a graph presenting the complete discharge at 1 A for the $O_2$/AB fuel cell.

The full cell is characterized by an OCP of 1.26 V.

The fuel cell power output corresponds to 2.1 W at 3.5 A.

The results of the full-discharge experiment at 1 A are shown in FIG. 3C.

The fuel cell outputs 0.76 W at 1 A, supplies 5.7 Wh, providing 1,900 Wh/kg AB.

The ammonia-borane discharge efficiency is about 46%.

The average value calculated from 23 similar experiments corresponds to about 40%.

Example 2

Hz/Air Fuel Cell

An exemplary hydrazine (Hz)/air fuel cell system according to some embodiments of the invention, as illustrated in FIG. 2B, was assembled as described in Example 1.

FIGS. 4A-B present the results obtained for $Hz/O_2$ fuel cell, (being 6×10×2.5 cm in size, 60 $cm^2$ in geometrical area) containing a commercial air cathode as described hereinabove and a Cu mesh cathode as described hereinabove in an anode solution containing 25 ml 65% w/v Hz (16.25 grams) and 25 ml 6 M KOH+4.2 grams solid KOH.

FIG. 4A is a graph presenting the voltammetric properties of this cell (LSV), at a scan rate of 20 mV·$s^{-1}$.

FIG. 4B is a graph presenting the complete discharge at 1 A.

The fuel cell is characterized by an OCP of 0.70 V.

The fuel cell power output corresponds to 0.37 W at 1 A.

The results of the full-discharge experiment at 1 A are shown in FIG. 4B.

The capacity corresponds to 11.6 Ah, the energy corresponds to 4.3 Wh.

Hydrazine efficiency corresponds to 21%.

Example 3

AB/Air Fuel Cell

Another exemplary AB/air fuel cell system according to some embodiments of the invention, as illustrated in FIG. 2A, was assembled using a Cu-mesh electrode (70 $cm^2$ geometrical area) as an anode and a commercial air cathode having a cobalt porphyrin catalyst (Evionyx, 70 $cm^2$ geometrical area).

A commercial hydroxide exchange membrane (Fumatech, membrane 20 μm) was used as a separator. The hydride exchange membrane (70 $cm^2$ geometrical area) was applied onto the air cathode by dispersing 10 ml N,N-dimethylacetamide around the air cathode membrane (with the use of a brush) and sticking the hydride exchange membrane on the air cathode under high pressure (about 6,000N) at 220° C. for 40 seconds.

In all experiments, anode and cathode area, and hence the fuel cell area, corresponds to 70 cm². The anode solution (2% ammonia borane in 6M KOH) was flowed continuously to the anode, at 20 ml/minute, by means of a peristaltic pump. A stock solution of the anode solution was prepared and flowed into the anode compartment of the fuel cell system such that 100 ml of the anode solution were circulated around the anode.

The fuel cell was operated by setting the produced current on 2 A and then on 1 A.

FIG. 5 presents long discharge curves for the ammonia borane/air fuel cell, with a continuous electrolyte flow. Blue line represents voltage and red line represents current.

The ammonia borane/air fuel cell outputs a stable voltage of 1.1 V at 2 A and provides power of about 2.2 W for 68 hours. After the 68-hour first cycle, a new batch of ammonia borane-containing electrolyte (2% ammonia borane in 6M KOH, at 20 ml/minute) was used and the cell was operated for about additional 60 hours, with an output 1 V at 1 A (1 W).

The discharge efficiency of ammonia borane was 33%.

Example 4

Hydrazine/Air Fuel Cell

Another exemplary Hz/air fuel cell system according to some embodiments of the invention, as illustrated in FIG. 2B, was assembled using a Cu-mesh electrode (70 cm² geometrical area) as an anode and a commercial air cathode (cobalt porphyrin catalyst, Evionyx, 70 cm² geometrical area).

A commercial hydroxide exchange membrane (Fumatech, membrane 20 μm) was used as a separator. The hydroxide exchange membrane (70 cm² geometrical area) was applied onto the air cathode by dispersing 10 ml N,N-dimethylacetamide around the air cathode membrane (with the use of a brush) and sticking the hydroxide exchange membrane on the air cathode under high pressure (about 6,000N) at 220° C. for 40 seconds.

In all experiments, anode and cathode, and hence fuel cell, area corresponds to 70 cm². Anode solution (2% hydrazine in 6M KOH) was continuous flowed, at 20 ml/minute, to the anode, by means of a peristaltic pump, as described in Example 3 hereinabove.

The fuel cell was operated by setting the initial produced current at 1.2 A, and by programming the system so as to decrease the produced current to 0.9 A once the voltage drops below 0.3 V, to decrease again the current to 0.8 A once the voltage drops again below 0.3 V, and to gradually decrease the current in 0.1 A intervals at each voltage dropping below 0.3 V.

FIG. 6A presents long discharge curves the hydrazine/air fuel cell, when operated as described hereinabove.

The hydrazine/air fuel cell outputs 0.5 V at 1.2 A. Output decreased to 0.3 V after 60 hours.

FIG. 6B presents the data obtained in a similar experiment, performed under a modified galvanostatic regimen.

Example 5

Mixed Fuel

A half cell was operated using a Cu-mesh electrode (A=1.25 cm², folded 4 times, as described hereinabove), an Ag|AgCl (sat. KCl) as reference electrode, and a fuel solution (170 ml), at galvanostatic stairs (current setting was raised by 0.5 A every 30 seconds). −0.5V was defined as maximum potential.

Preliminary experiments were made with a hydrazine solution (170 ml KOH, 6 M and 7.6 ml 64% w/v hydrazine) as a fuel and showed that the anode does not function at a current of 1 A, presumably due to the woven nature of the Cu electrode.

A mixture of ammonia-borane and hydrazine mixture (1:1 mole) was therefore used as fuel.

FIG. 7 below presents the galvanostatic stairs for a half-cell operated with ammonia-borane and hydrazine mixture (1:1 mole ratio) as fuel. The fuel solution contains 170 ml 6M KOH and 7.6 ml 64% w/v hydrazine monohydrate+3 grams ammonia borane.

As shown in FIG. 7, the anode functions well with the mixed ammonia boran/hydrazine fuel, also at 1 A.

The same cell was operated also in the presence of a fuel solution containing 170 ml 6M KOH, and 7.6 ml 64% w/v hydrazine (0.15 mole)+3.1 grams (0.1 mole) ammonia-borane (3:2 mole ratio).

FIG. 8 presents the full discharge at 1 A of Cu-mesh/hydrazine and ammonia-borane mixture (3:2 mole ratio), observed in long discharge experiments.

As shown in FIG. 8, the hydrazine is oxidized at a lower potential, of about −0.57 V, within a time range of 20-71 Ks. The ammonia borane is oxidized within a time range of 0-20 Ks.

The discharge efficiency of ammonia borane (0-20 Ks) was calculated as 34% and the discharge efficiency of hydrazine (20-71 Ks) as 87%.

Similar long discharge experiments were performed with a mixed fuel containing a lower relative amount of ammonia borane.

FIG. 9 presents full discharge at 1 A of Cu-mesh/hydrazine and ammonia-borane mixture (8:1 mole ratio). −0.5 V was defined as maximum potential. The fuel solution contained 170 ml 6M KOH and 7.6 ml 64% w/v hydrazine (0.152 mole)+0.6 grams (0.019 mole) ammonia borane. Ag|AgCl (sat. KCl) was used as reference electrode.

As shown in FIG. 9, hydrazine is oxidized at a lower potential of about −0.57 V within the time range of 5-71 Ks, and the ammonia borane is oxidized within the time range of 0-5 Ks.

These experiments demonstrate that the hydrazine is oxidized at a lower potential when ammonia borane is added, even in the presence of a small amount of AB compared to hydrazine (e.g., 8:1 Hz/AB mole ratio).

The Cu-woven electrode (A=1.25 cm², folded 4 times) used in these experiments was subjected to SEM imaging under the applied galvanostatic regime. The obtained images are presented in FIGS. 10-12.

The obtained SEM images show that the Cu mesh electrode becomes more rough following a galvanostatic regime of 1 A for 5 hours, with a fuel solution containing 0.1M AB+0.9 M Hz in 6M KOH (see, FIGS. 10A-C), compared to the Cu-woven mesh electrode following a galvanostatic regime of 1 A for 5 hours, with a fuel solution containing 0.5M AB in 6M KOH (see, FIGS. 11A-C) and to untreated Cu-woven mesh electrode (See, FIGS. 12A-C).

Without being bound by any particular theory, it is seen that the operating the anode with a AB/Hz mixture as fuel enhances the roughness of the Cu-anode, and presumably thus enhances its surface area. The enhanced roughness of the Cu-anode renders it more efficient in catalyzing the electro-oxidation of hydrazine (as can be seen by the lower potential at which electro-oxidation is effected). Thus, when the system was operated under a galvanostatic regime, an overpotential of more than 150 mV is observed. The enhanced roughness is seen only upon operating the cell with the mixed fuel.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A fuel cell system comprising an anode compartment which comprises an anode having a copper catalyst layer, a cathode configured as an air cathode, and a solid electrolyte membrane interposed between said anode and said cathode, the fuel cell being operable by contacting the anode with an amine-derived fuel and contacting the cathode with oxygen or air, wherein said air cathode comprises a metal complex which is a cobalt porphyrin complex.

2. The fuel cell system of claim 1, wherein said amine derived fuel comprises a compound having a formula: $R_1R_2R_3N-BR_4R_5R_6$, wherein each of $R_1$-$R_6$ is independently selected from the group consisting of hydrogen, alkyl, alkenyl, alkynyl, heteroalicyclic, alkoxy, and amine, provided that at least one of $R_4$, $R_5$ and $R_6$ is hydrogen.

3. The fuel cell system of claim 1, wherein said amine-derived fuel comprises a compound having a formula: $R_7R_8N-NR_9R_{10}$, wherein each of $R_7$-$R_{10}$ is independently selected from the group consisting of hydrogen, alkyl, alkenyl, alkynyl, hydrazide and amine, provided that at least one of $R_7$-$R_{10}$ is hydrogen.

4. The fuel cell system of claim 1, wherein said amine-derived fuel is selected from the group consisting of:
a compound having a formula: $R_1R_2R_3N-BR_4R_5R_6$, wherein each of $R_1$-$R_6$ is independently selected from the group consisting of hydrogen, alkyl, alkenyl, alkynyl, heteroalicyclic, alkoxy, and amine, provided that at least one of $R_4$, $R_5$ and $R_6$ is hydrogen;
a compound having a formula: $R_7R_8N-NR_9R_{10}$, wherein each of $R_7$-$R_{10}$ is independently selected from the group consisting of hydrogen, alkyl, alkenyl, alkynyl, hydrazide and amine, provided that at least one of $R_7$-$R_{10}$ is hydrogen; and
a mixture of said compound having a formula: $R_1R_2R_3N-BR_4R_5R_6$ and said compound having a formula: $R_7R_8N-NR_9R_{10}$.

5. The fuel cell system of claim 1, wherein said air cathode comprises a $MnO_2$ catalyst layer.

6. The fuel cell system of claim 1, wherein said solid electrolyte membrane is deposited onto said air cathode.

7. The fuel cell system of claim 1, wherein said solid electrolyte membrane is a hydroxide-permeable membrane.

8. The fuel cell system of claim 1, wherein said solid electrolyte membrane comprises one or more polymers and/or copolymers.

9. The fuel cell system of claim 8, wherein said solid electrolyte membrane comprises poly(vinyl alcohol-co-ethylene).

10. The fuel cell system of claim 9, wherein said solid electrolyte membrane further comprises polyethylene glycol (PEG).

11. The fuel cell system of claim 8, wherein said solid electrolyte membrane further comprises a cross-linking agent.

* * * * *